(12) United States Patent
Fukuda et al.

(10) Patent No.: US 8,797,590 B2
(45) Date of Patent: Aug. 5, 2014

(54) PRINTING CONTROL PROGRAM PRODUCT, PRINTING CONTROL APPARATUS, AND PRINTING SYSTEM

(75) Inventors: Masahiro Fukuda, Tokyo (JP); Takashi Toriumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 125 days.

(21) Appl. No.: 13/469,273

(22) Filed: May 11, 2012

(65) Prior Publication Data

US 2012/0307262 A1 Dec. 6, 2012

(30) Foreign Application Priority Data

Jun. 2, 2011 (JP) ................................ 2011-124538

(51) Int. Cl.
*G06F 15/00* (2006.01)

(52) U.S. Cl.
USPC .......................................................... 358/1.2

(58) Field of Classification Search
USPC .......................................................... 358/1.2
See application file for complete search history.

(56) References Cited

U.S. PATENT DOCUMENTS

2008/0240887 A1 10/2008 Gotoh et al.
2011/0235064 A1* 9/2011 Arai ............................... 358/1.2

FOREIGN PATENT DOCUMENTS

JP 2008-268818 A 11/2008
JP 2009-134440 A 6/2009

* cited by examiner

*Primary Examiner* — Saeid Ebrahimi Dehkordy
(74) *Attorney, Agent, or Firm* — Harness, Dickey & Pierce, P.L.C.

(57) ABSTRACT

A printing control program product is disclosed, which causes a computer to function as a printer control unit; a printing conditions control processing unit; and an overall control unit which, for a printing job with a determined result of not matching, when a size of a sheet onto which printing is to be made can be generated by cutting a mounted sheet, arranges picture drawing data of a printed output in a layout suitable for the size of the sheet onto which the printing is to be made by cutting the mounted sheet, along the layout after the printing, and generating the printed output.

7 Claims, 22 Drawing Sheets

FIG.11

| SHEET SIZE BEFORE CUTTING | SHEET SIZE WHICH CAN BE GENERATED BY CUTTING |
|---|---|
| A3 | A4,A5 |
| B4 | B5 |
| A4 | A5 |
| A5 | NONE |
| B5 | NONE |

FIG.14

A3 SHEET, PAGE ARRANGEMENT OF FRONT OF FIRST SHEET
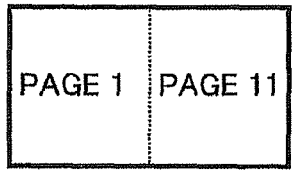

A3 SHEET, PAGE ARRANGEMENT OF BACK OF FIRST SHEET
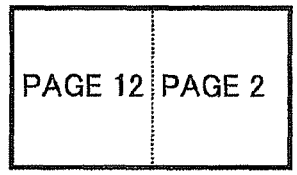

A3 SHEET, PAGE ARRANGEMENT OF FRONT OF SECOND SHEET
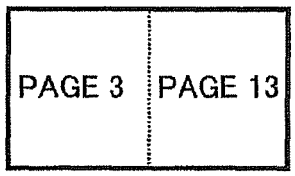

A3 SHEET, PAGE ARRANGEMENT OF BACK OF SECOND SHEET
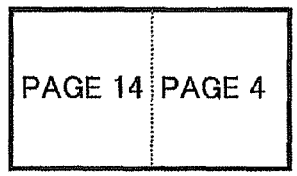

A3 SHEET, PAGE ARRANGEMENT OF FRONT OF THIRD SHEET
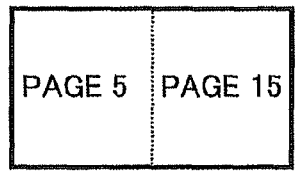

A3 SHEET, PAGE ARRANGEMENT OF BACK OF THIRD SHEET
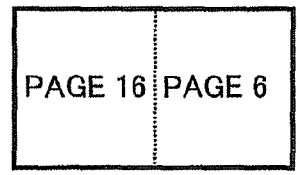

A3 SHEET, PAGE ARRANGEMENT OF FRONT OF FOURTH SHEET
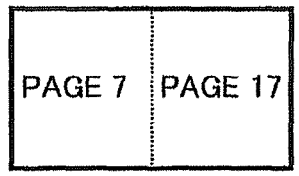

A3 SHEET, PAGE ARRANGEMENT OF BACK OF FOURTH SHEET
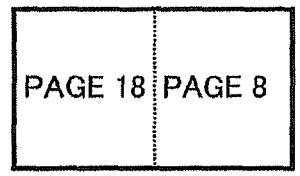

A3 SHEET, PAGE ARRANGEMENT OF FRONT OF FIFTH SHEET
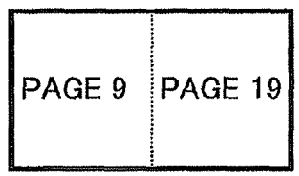

A3 SHEET, PAGE ARRANGEMENT OF BACK OF FIFTH SHEET
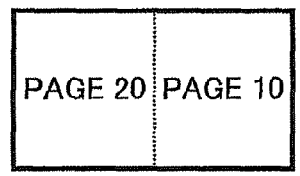

} PAGE ARRANGEMENT OF EACH SHEET

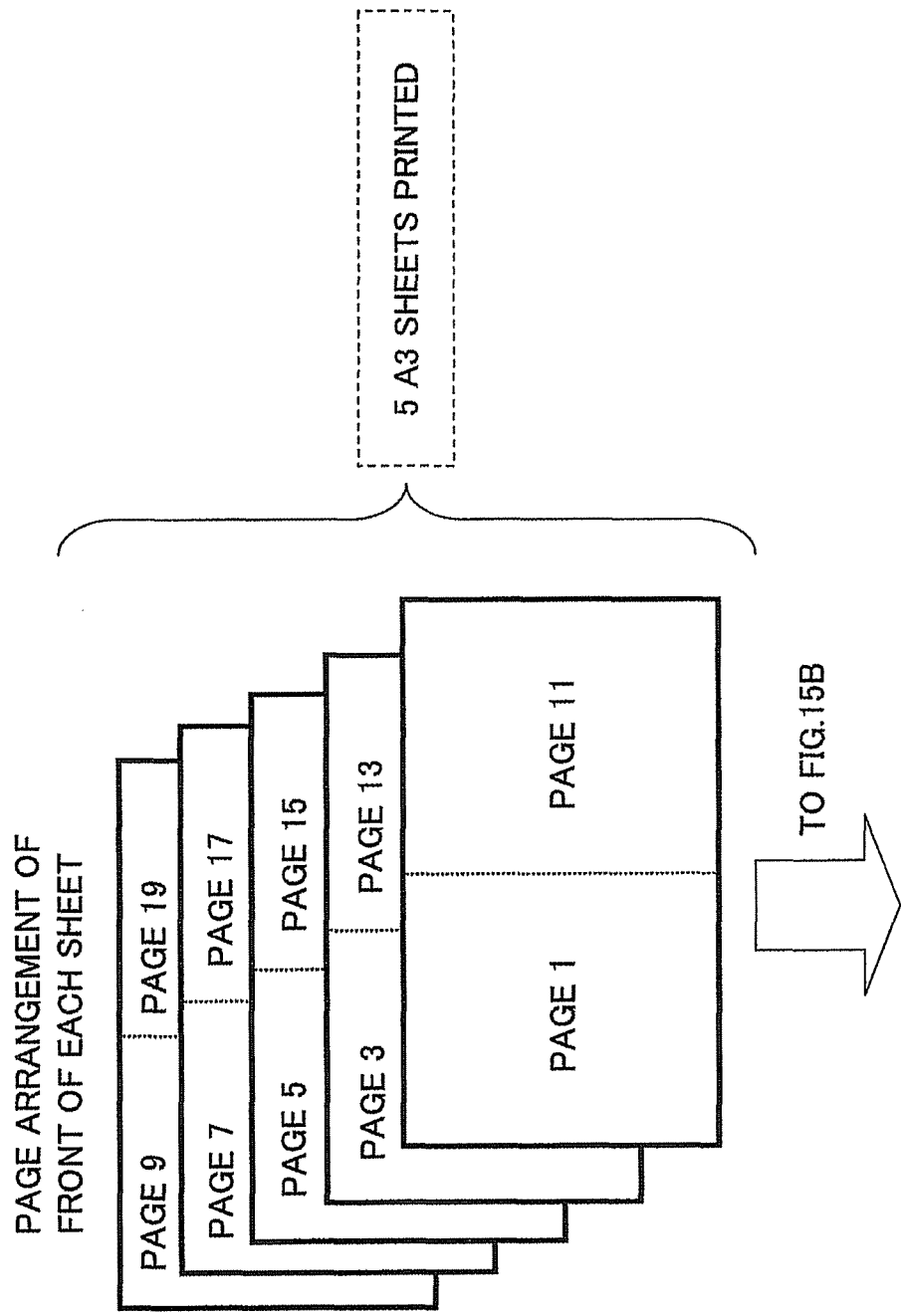

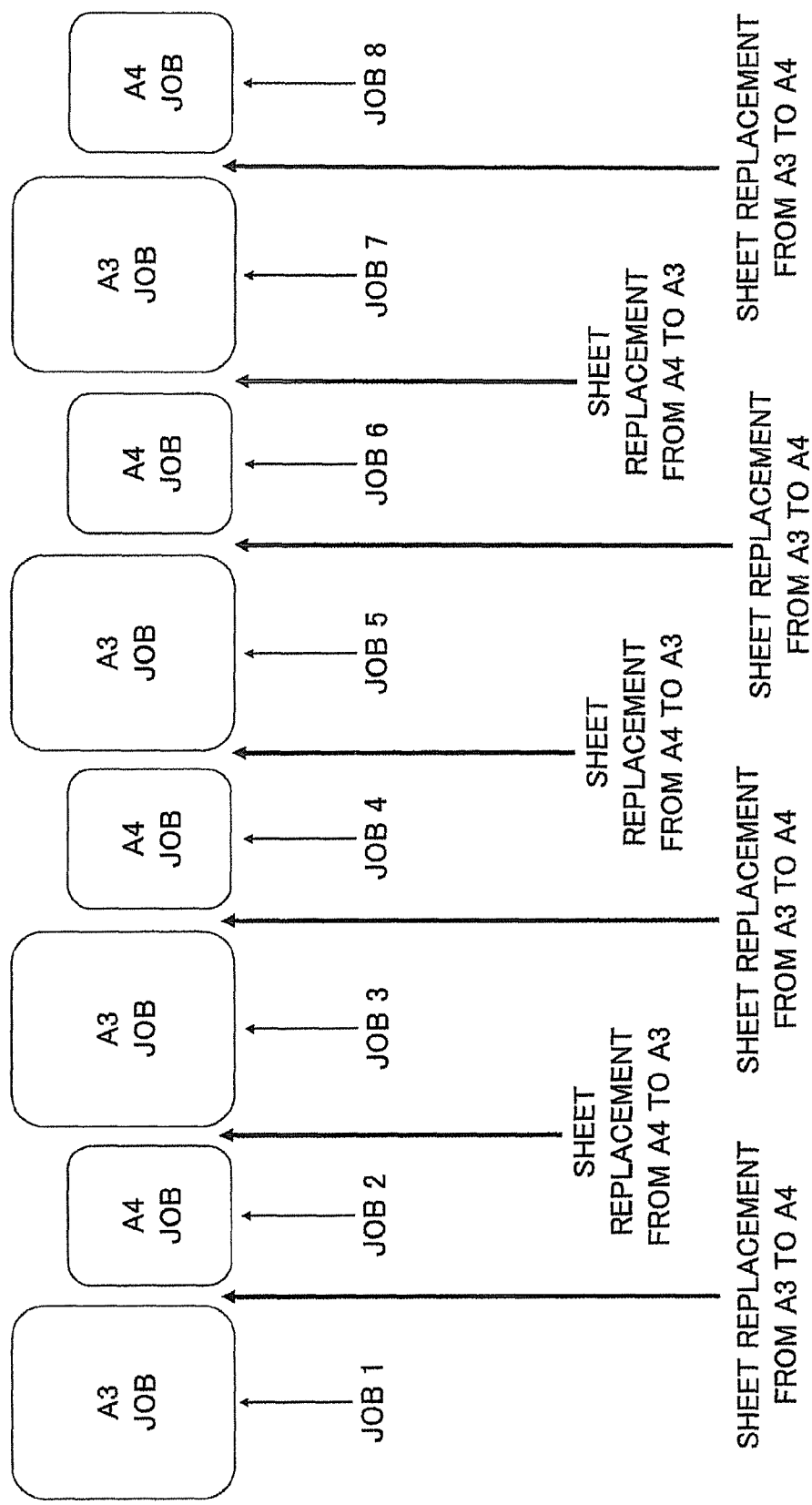

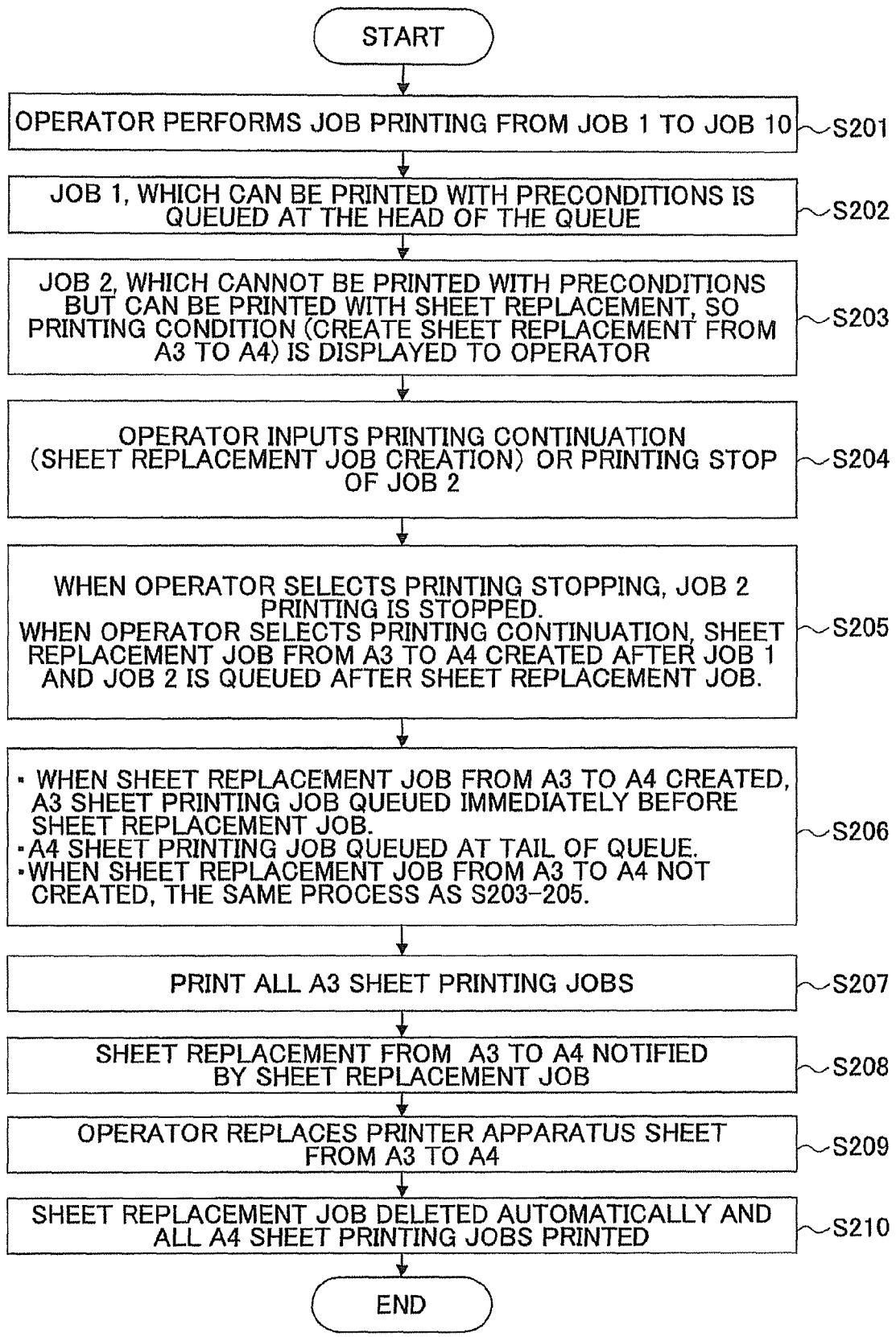

PRINTING CONTROL PROGRAM PRODUCT, PRINTING CONTROL APPARATUS, AND PRINTING SYSTEM

TECHNICAL FIELD

The present invention relates to printing control program products, printing control apparatuses, and printing systems.

BACKGROUND ART

Recently, in the commercial printing industry, a POD market has been emerging in which a relatively small-lot printed matter called POD (Printed On Demand) is delivered to a customer in a short lead time. In the POD market, orders are often received from multiple customers. As a result, in the POD market, printing conditions of printed outputs and printed matter for which a manuscript thereof is submitted to a printing vendor are often diverse. In order to make a profit under such diverse printing conditions, it is necessary to improve operational efficiency.

A first measure which leads to the improved operational efficiency may be a reduction of downtime in a printing process. An example of the downtime includes the following. According to a request of a customer, a printing vendor carries out a pre-press operation and a printing process. However, when various conditions actually set in a printer apparatus do not match a printing condition designated by the pre-press operation, a submission of a printing job causes an error, making it not possible to conduct printing. In this case, the printing vendor may change either one of printing conditions designated by the pre-press operation and conditions set in the printer apparatus and cause both to match, releasing the error condition and performing a printing process.

In this way, when the error occurs, the printing process is stopped unless either of the printing conditions designated by the pre-press operation and the conditions set in the printer is changed, causing a downtime to occur where printing is actually made. In addition, the downtime becomes longer the lower the level of recognition of the error occurrence by an operator.

As a specific example of a case in which the downtime occurs, when a customer requests an A4 size printed material, an operator designates the A4 size printed material, the operator designates the A4 size printing material in the pre-press operation, and a size of a sheet mounted in the printer apparatus is an A3 size, for example, the sheet sizes do not match, causing the printing process to be stopped.

Moreover, when there is one operator and where the pre-press operation is actually performed and an installed location of the printer apparatus are distant, the operator fails to know in advance that the sheet sizes do not match and comes to know for the first time that the sheet sizes do not match only after he is notified of an error, so that the downtime becomes even longer.

In the above case, while it is common to change the size of the sheet mounted in the printing apparatus from the A3 size to the A4 size and match the sheet sizes to cause the processing process to resume, a moving time increases when the installed location of the printer apparatus and where the pre-press operation is actually performed are distant, causing some time in the sheet replacement operation of the printer apparatus. Moreover, when there is no A4 size sheet to be replaced with where the printing is actually performed, the printing process cannot be carried out unless the A4 size sheet is ordered.

In the above-described case, two pages of A4 size printing data desired by the customer are printed on an A3 size sheet, after which they are cut at a central portion of the A3 size sheet, making it possible to generate an A4 size printed sheet.

With an aim at the printing process, in the above case, printing data corresponding to two A4 size pages are arranged in a 2Up layout on one A3 size sheet, a setting is made for printing onto the A3 size sheet, and a further setting for cutting at a central portion of the printed sheet is performed to generate a printing job for transmitting to the printer apparatus.

Moreover, the above case represents a status such that the A3 size sheet is mounted in the printing apparatus, so that a printing process may be performed without an error occurrence as the sheet sizes match even when a printing job is received in which a setting is made for printing onto the A3 size sheet.

In the above case, printing may be made onto the A3 size paper, after which cutting may be made at a central portion of the sheet by a cutting machine connected to the printer apparatus, and printed matter corresponding to two A4 size sheets may be generated. Thereafter, it suffices for the operator to overlap the printed matter corresponding to the two A4 size sheets in an intended order. With such a continuous operation, an A4 size printed matter requested by the customer is generated without an occurrence of downtime.

In the above case, while a single-face printing of two A4 size pages is described as an example, the above-described printing process may be performed also in a double-face printing, taking into account pages to be laid out on the front and the back of the sheet.

For printing on an A3 size sheet that results in multiple pages, in performing the above-described printing process, it is operationally most efficient when all of the pages are printed onto the A3 size sheets, after which all of the A3 size sheets are cut at once at the central portion thereof, and the cut A4 size printed sheets are collectively overlapped. However, in the above-described case, it is necessary to take into account a page arrangement of the A4 size printing data to be laid out onto the A3 size sheet.

When the first page and the second page are merely laid out onto the A3 size sheet, it may happen that the printed matter is not eventually generated in an expected order of pages when overlapping of the cut printed sheets are collectively performed for all of the pages. Thus, it is necessary to lay out onto an A3 size sheet, taking into account the page order after the printed sheets are overlapped.

A printing method called multi-face printing exists in which multiple sheets of different manuscripts are paginated on the same sheet for printing, and it is already known to paginate such that different manuscripts are paginated on the same sheet for printing, after which cutting is made with a cutting machine, and then are overlapped, so that the manuscripts are ordered in an aligned manner (see Patent document 1, for example.)

Patent Document

Patent Document 1: JP2009-134440A

However, even when a printing job is generated for which a change of the page order and a layout setting, taking cutting into account, are correctly carried out in the printing process, an error will eventually occur unless the sheet size of the printing job and the size of the sheet mounted in the printer apparatus match. There is a problem that, when the error occurs, the printing process is stopped, leading to an inability to reduce the downtime in the printing process and to improve the operational efficiency.

DISCLOSURE OF THE INVENTION

In light of the problems as described above, an object of the present invention is to provide a printing control program product, a printing control apparatus, and a printing system that reduce downtime in a printing process to improve operational efficiency.

Elements, representations, or arbitrary combinations of the elements of the present invention being applied to a method, an apparatus, a system, a computer program product, a recording medium, or a data structure are also effective as a mode of the present invention.

According to an embodiment of the present invention, a printing control program product is provided, which causes a computer to function as a printer control unit which obtains a size of a sheet mounted in a printer apparatus or a device apparatus; a printing conditions control processing unit which determines whether the size of the sheet mounted in the printer apparatus or the device apparatus matches a size of a sheet onto which printing is to be made, which printing is included in printing conditions designated by an operator to generate a printed output; and an overall control unit which, for a printing job with the determined result of not matching, when the size of the sheet onto which the printing is to be made can be generated by cutting the mounted sheet, arranges picture drawing data of the printed output in a layout suitable for the size of the sheet onto which the printing is to be made by cutting the mounted sheet, along the layout after the printing, and generating the printed output.

The present invention makes it possible to reduce downtime in the printing process to improve operational efficiency.

BRIEF DESCRIPTION OF THE DRAWINGS

Other objects, features, and advantages of the present invention will become more apparent from the following detailed descriptions when read in conjunction with the accompanying drawings, in which:

FIG. 11 is a table showing an example of a combination of sheet sizes which can be cut and generated;

FIG. 14 is an image diagram of an exemplary printed output;

FIGS. 15A, 15B, and 15C are image diagrams of an exemplary printed output;

FIG. 16 is an explanatory diagram showing a status of a common queue when there is no sheet replacement job;

FIG. 20 is a flowchart showing an example of a processing procedure of a printing system when a sheet replacement job is used for an operator to print a printing job.

BEST MODE FOR CARRYING OUT THE INVENTION

Figure 1:
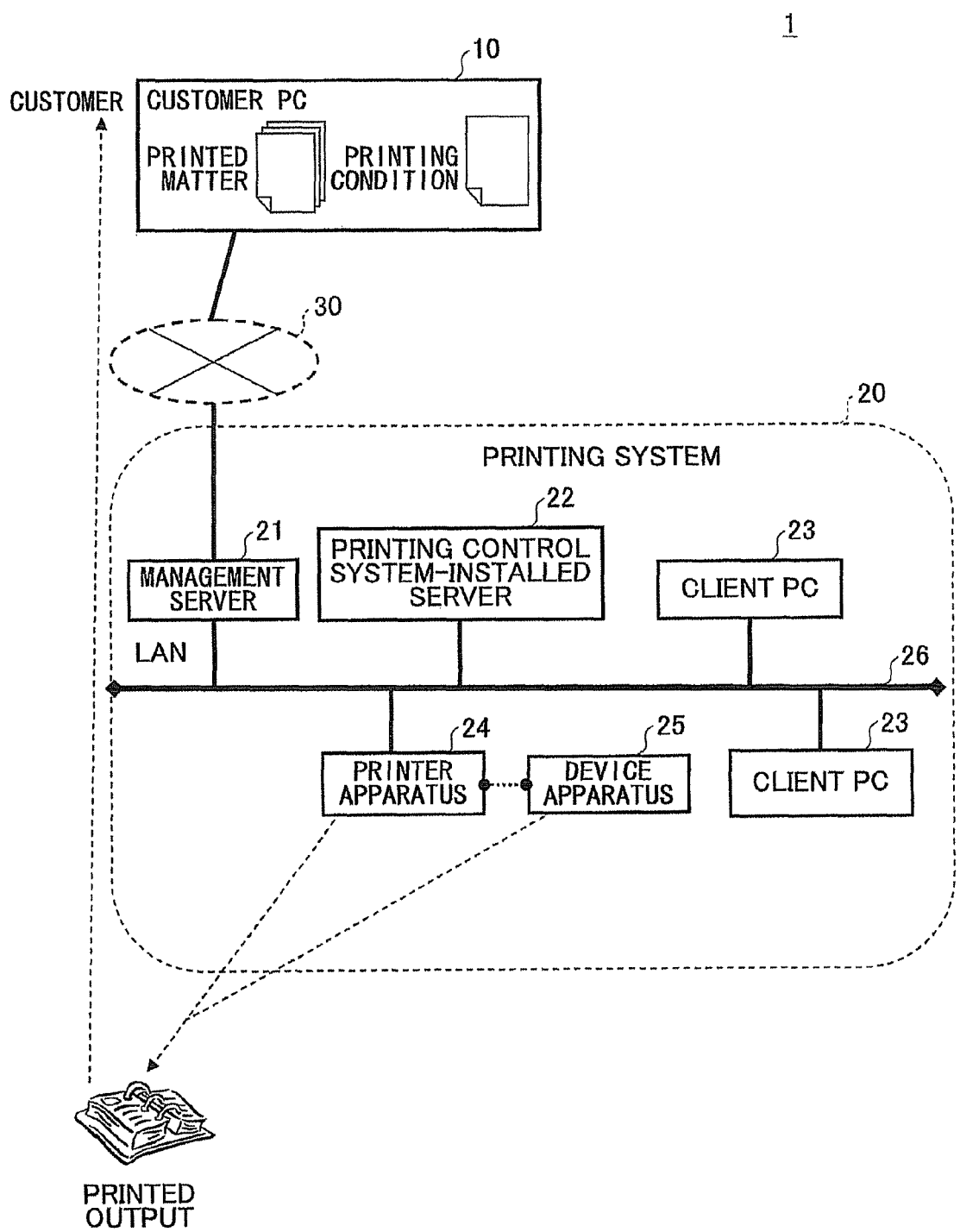
FIG. 1 is a configuration diagram of an exemplary system which includes a printing system according to the present embodiment.

Next, modes for carrying out the invention are described based on the following embodiments with reference to the drawings.

(Overview)

A printing system according to the present embodiment includes the following features in printing with a printing job for which a size of a sheet mounted in a printer apparatus does not match a sheet size designated by an operator for generating printed matter.

In the printing system of the present embodiment, when it is possible to generate the sheet size designated by the operator for generating the printed matter by cutting the sheet mounted in the printer apparatus, laying out and printing that are suitable for the size of the image data are performed onto the sheet mounted in the printer apparatus, and cutting is performed along the layout after the printing. Moreover, the printing system of the present embodiment performs laying out such that collectively overlapping the cut sheets results in a correct page order. Therefore, in the printing system of the present embodiment, the cut sheets may be collectively overlapped to generate printed matter with a designated sheet size and a correct page order.

Moreover, when it is not possible to generate the sheet size designated by the operator for generating the printed matter by cutting of the sheet mounted in the printer apparatus, generating a sheet replacement job which prompts the operator to replace the sheet and causes interrupts at an arbitrary position of a job sequence make it possible to carry out a sheet replacement operation at an arbitrary timing.

The printing system according to the present embodiment may generate a sheet replacement job which prompts an operator to perform sheet replacement from a first sheet size to a second sheet size to be processed as one job within a job sequence to reduce a sheet replacement operation as described below.

The sheet replacement job is treated as a job, making it possible to cause the job to interrupt at an arbitrary position within a queued job sequence. The sheet replacement job holds, as information, a size of a sheet onto which the printing job before and after the sheet replacement prints.

The sheet replacement job is a job executed for making the operator perform the sheet replacement. Even when the size of the sheet onto which a printing job group being queued before the sheet replacement job prints differs from the size of the sheet onto which a printing job group being queued after the sheet replacement job prints, the sheet replacement job is executed to replace the sheet size, so that the size of the sheet onto which the printing job group being queued after the sheet replacement job prints and the size of the sheet mounted in the printer apparatus match. Moreover, the sheet replacement job may be caused to interrupt at an arbitrary position within a job sequence, so that, for printing multiple printing jobs, when it is known that printing jobs with different sheet sizes are to be printed, the sheet replacement job is caused to interrupt before the printing job in which replacement of the sheet size occurs, making it possible for the operator to perform the sheet replacement.

The sheet replacement job differs from a printing job per se, so that even when there occurs a mismatch with the size of the sheet mounted in the printing apparatus, control is performed such that it is possible to queue it in the job queue. Moreover, the printing job is controlled such that, even when there occurs a mismatch with the size of the sheet being mounted in the printer apparatus, it may be queued in the job sequence as long as there is a match with the sheet size after the sheet replacement that is held by the sheet replacement job.

After the sheet replacement is performed by executing the sheet replacement job, the printing system of the present embodiment performs printing onto the sheet mounted in a printing apparatus if the size of the sheet mounted in the printer apparatus matches the size of the sheet onto which a printing job after the sheet replacement job is to print.

Moreover, after the sheet is replaced by executing the sheet replacement job, the printing system of the present embodiment cuts the size of the sheet mounted in the printer apparatus to perform, when there is a match with the size of the sheet onto which the printing job after the sheet replacement job is to print, a layout and printing suitable for the size of image data onto the sheet mounted in the printer apparatus, and cutting is performed along the layout after the printing.

The above features of the printing system of the present embodiment make it possible to reduce downtime in the printing process and time during which operations are stopped.

(Overall Configuration of Printing System)

FIG. 1 is a configuration diagram of an exemplary system which includes a printing system according to the present embodiments. In the system 1 in FIG. 1, a customer PC 10 and a printing system 20 are connected via a network 30 such as the Internet, etc. The customer PC 10 is an apparatus which is used by a customer. The printing system 20 is a system which is used by an operator of a printing vendor, etc.

Moreover, the printing system 20 has a management server 21, a printing control system-installed server 22, a client PC 23, a printer apparatus 24, a device apparatus 25, and a network 26 such as a LAN, etc. The management server 21, the printing control system-installed server 22, one or more of the client PCs 23, and the printer apparatus 24 are connected via the network 26. The device apparatus 25 is connected to the printer apparatus 24. The device apparatus 25 may be connected with the network 26.

The management server 21 generates a JDF (job definition format), also called a job ticket, which defines printing conditions and manuscript submission management of printed matter from the customer. The management server 21 may have a function equivalent to a server called a MIS (management information system).

The printing control system-installed server 22 has a printing control system installed. Moreover, the client PC 23 is an apparatus for the operator to operate functions included in the printing control system to perform a printing operation. The printer apparatus 24 is an apparatus which prints a printing job and generates a printed output. At least one printer apparatus 24 may be connected to the network 26. The device apparatus 25 is an apparatus which becomes necessary in printing and post-operation processes.

The customer operates the customer PC 10, transmits via the network 30 to the management server 21, as manuscript submission data, printing conditions and printing data of the printed matter, and requests for printing. In response to the request for printing from the customer PC 10, the management server 21 performs management operations such as management of manuscript submission data, estimation of printing operations, management of order lead time of the printed output, and process of delivery of the printed output. Moreover, the management server 21 uses a JDF generating application, etc., to generate a JDF from printing conditions necessary for generating the printed output for which printing is requested by the customer.

The operator operates functions included by the printing control system and causes the printing control system-installed server 22 to obtain the JDF and the printing data from the management server 21. From the obtained JDF and the printing data, the printing control system-installed server 22 generates the printed output with below-described control.

(Hardware Configuration of Printing Control System-Installed Server 22)

Figure 2:
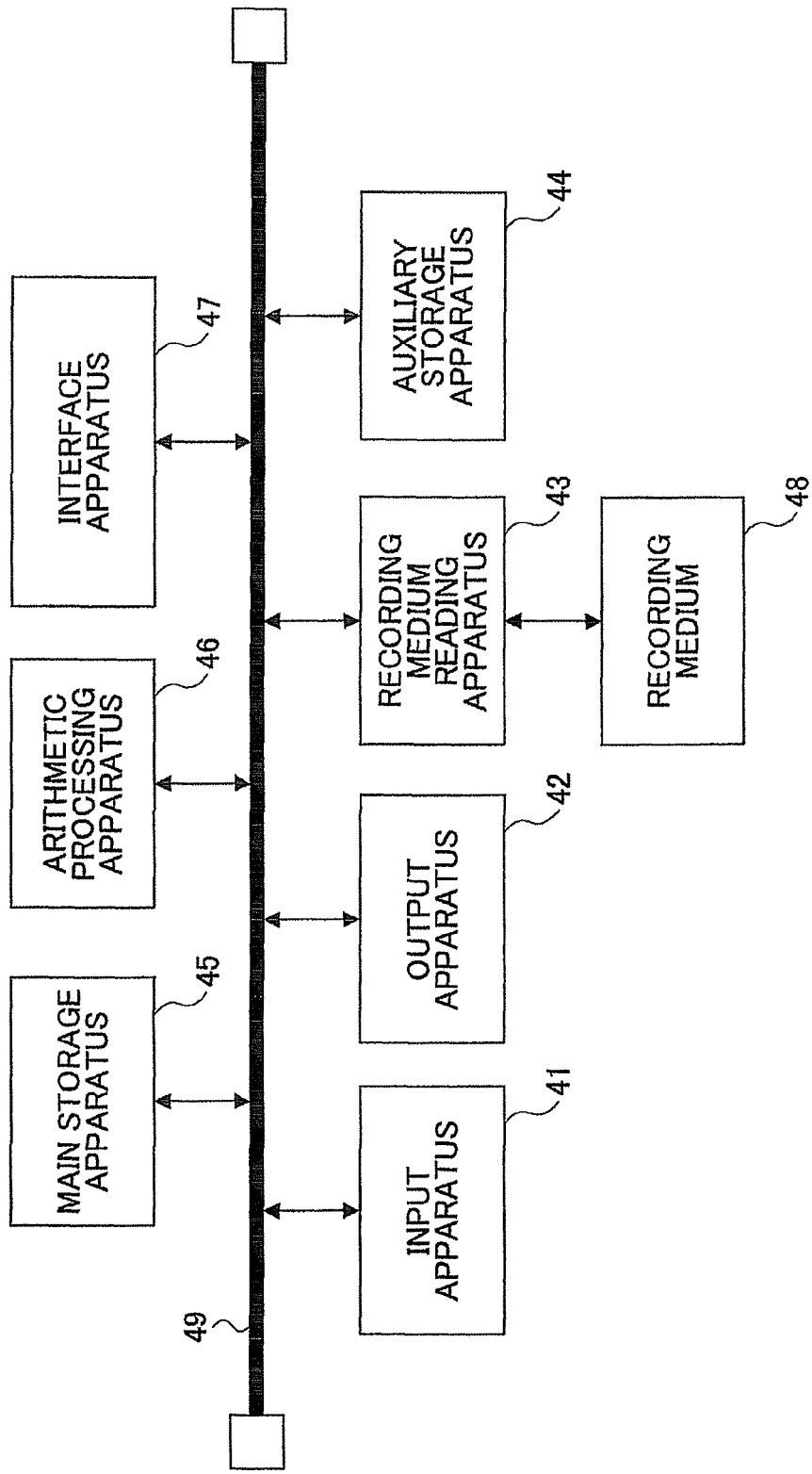
FIG. 2 is a hardware configuration diagram of an exemplary PC.

The printing control system-installed server 22 is realized with a PC with a hardware configuration as shown in FIG. 2, for example. FIG. 2 is a hardware configuration diagram of an exemplary PC. The PC 40 includes an input apparatus 41, an output apparatus 42, a recording medium reading apparatus 43, an auxiliary storage apparatus 44, a main storage apparatus 45, an arithmetic processing apparatus 46, and an interface apparatus 47 that are mutually connected via a bus 49.

The input apparatus 41 includes a keyboard, a mouse, etc. The input apparatus 41 is used for inputting various signals. The output apparatus 42 includes a display apparatus, etc. The output apparatus 42 is used for displaying various windows, data, etc. The interface apparatus 47 includes a modem, a LAN card, etc. The interface apparatus 47 is used for connecting to the network 26.

A printing control program installed in the printing control system-installed server 22 is at least a part of various programs which control the PC 40. The printing control program is provided by distributing the recording medium 48, downloading from the network 26, etc., for example.

For the recording medium 48, various types of recording media may be used such as a recording medium which optically, electrically, or magnetically records information such as a CD-ROM, a flexible disk, a magneto-optical disk, etc.; or a semiconductor memory which electrically records information such as a ROM, a flash memory, etc.

When the recording medium 48 having recorded the printing control program therein is set in the recording medium reading apparatus 43, the printing control program is installed from the recording medium 48 in the auxiliary storage apparatus 44 via the recording medium reading apparatus 43. The printing control program which is downloaded from the network 26, etc., and is installed in the auxiliary storage apparatus 44 via the interface apparatus 47.

The auxiliary storage apparatus 44 stores the printing control program, a required file, data, etc. The main storage apparatus 45 reads the printing control program from the auxiliary storage apparatus 44 at the time of launching the printing control program. Then, the arithmetic processing apparatus 46 implements various processes as described below according to the printing control program stored in the main storage apparatus 45.

(Functional Configuration)

Figure 3:
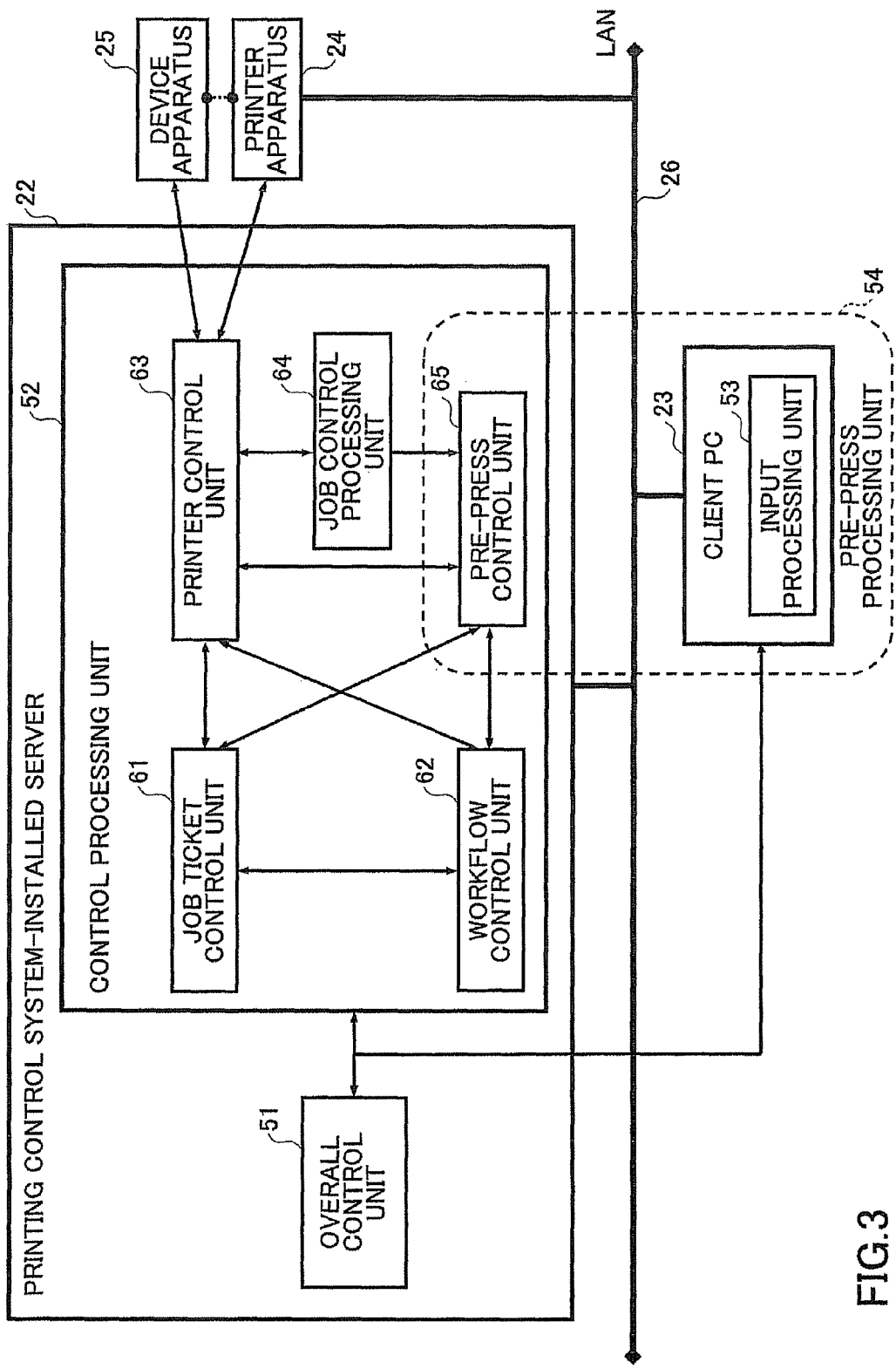
FIG. 3 is a processing block diagram for explaining an exemplary printing control system.

For the printing system 20 as shown in FIG. 1, the printing control system-installed server 22 is realized in a processing block as shown in FIG. 3, for example. FIG. 3 is a processing block diagram for explaining an exemplary printing control system.

The printing control system-installed server 22 has a printing control program installed. The printing control system-installed server 22 executes the printing control program to realize an overall control unit 51 and a control processing unit 52. Moreover, the client PC 23 is used to realize an input processing unit 53. The printing control system includes the overall control unit 51, the control processing unit 52, and the input processing unit 53.

The control processing unit 52 includes a job ticket control unit 61, a workflow control unit 62, a printer control unit 63, a job control processing unit 64, and a pre-press control unit 65. The input processing unit 53 and the pre-press control unit 65 collectively form a pre-press processing unit 54.

The job ticket control unit 61 receives a JDF generated by the management server 21. For each printing process, the job ticket control unit 61 analyzes what is described in the JDF in an XML (Extensible markup language) format. Moreover, the job ticket control unit 61 performs operations of analyzing and editing the JDF, such as editing an XML description of the JDF so that, when there is a change in the printing process procedure, there is a match with the changed contents.

Based on the analyzed results of the JDF by the job ticket control unit 61, the workflow control unit 62 generates a workflow for each printing process from submission of a printed matter manuscript to generation of a printed output. Moreover, the workflow control unit 62 performs editing control of the workflow when the printing process procedure changes. Furthermore, the work flow control unit 62 instructs that an operation be started for each printing process. Moreover, the workflow control unit 62 performs management of the process such as a progress status for each printing process and status displaying for each printing process.

The pre-press control unit 65 performs drawing of picture image data (printing data) of the printing matter; control of pre-press operations such as color modification, layout modification and binding position modification that are performed by the operator from the input processing unit 53 on the printed matter whose manuscript is submitted; displaying, by the input processing unit 53, of the printing image modified by the above-described modification operations; and generating of a printing job from a modified printing image. The pre-press control unit 65 and the input processing unit 53 may be collectively built on the same server.

For the generated printing job, the job control processing unit 64 performs allocating to the printer apparatus 24; queuing control when multiple printed jobs are printed; status control of the respective printing jobs; and control of a sheet replacement job.

For the allocating to the printer apparatus 24 and the status control of the respective printing jobs, it communicates with the printer control unit 63, determines the printer apparatus 24 by which printing is possible, and obtains a printing job status such as whether printing of a printing job has been completed, for example. Moreover, the queuing control makes it possible to print multiple printing jobs consecutively, queuing a printing job submitted later after a printing job submitted earlier. Moreover, the job control processing unit 64 obtains a printing status of a printing job being printed currently, and transmits the following job to the printer control unit 63 upon completion of the printing.

The printer control unit 63 controls the printer apparatus 24 with a printing condition defined in the JDF and prints the printing job transmitted. Moreover, the printer control unit 63 obtains operational information of the printer apparatus 24 connected to the network 26 and the device apparatus 25 connected to the printer apparatus 24.

More specifically, the printer control unit 63 obtains the status of the printer apparatus 24, obtaining whether printing is currently possible by the printer apparatus 24, and returns the obtained results to an associated processing unit such as the job control processing unit 64, etc. Moreover, the printer control unit 63 obtains a status of a printing job being printed by the printer apparatus 24, and returns the obtained results to the associated processing unit. For obtaining the status of the printer apparatus 24, a method of obtaining it by communication via an engine interface is commonly known. Moreover, for obtaining the status of the printing job, obtaining by a MIB (management information base) is known.

The overall control unit 51 provides an operational instruction to the input processing unit 53, the job ticket control unit 61, the workflow control unit 62, the printer control unit 63, the job control processing unit 64, and the pre-press control unit 65. The overall control unit 51 provides an operational instruction to the respective control subunit groups which make up the input processing unit 53, the job ticket control unit 61, the workflow control unit 62, the printer control unit 63, the job control processing unit 64, and the pre-press control unit 65. In response to the operational instruction, the respective control subunit groups provide an operational instruction and transmit and receive required information among the respective control subunits. Details of the respective control subunits will be described later.

(Process Flow)

Figure 4:
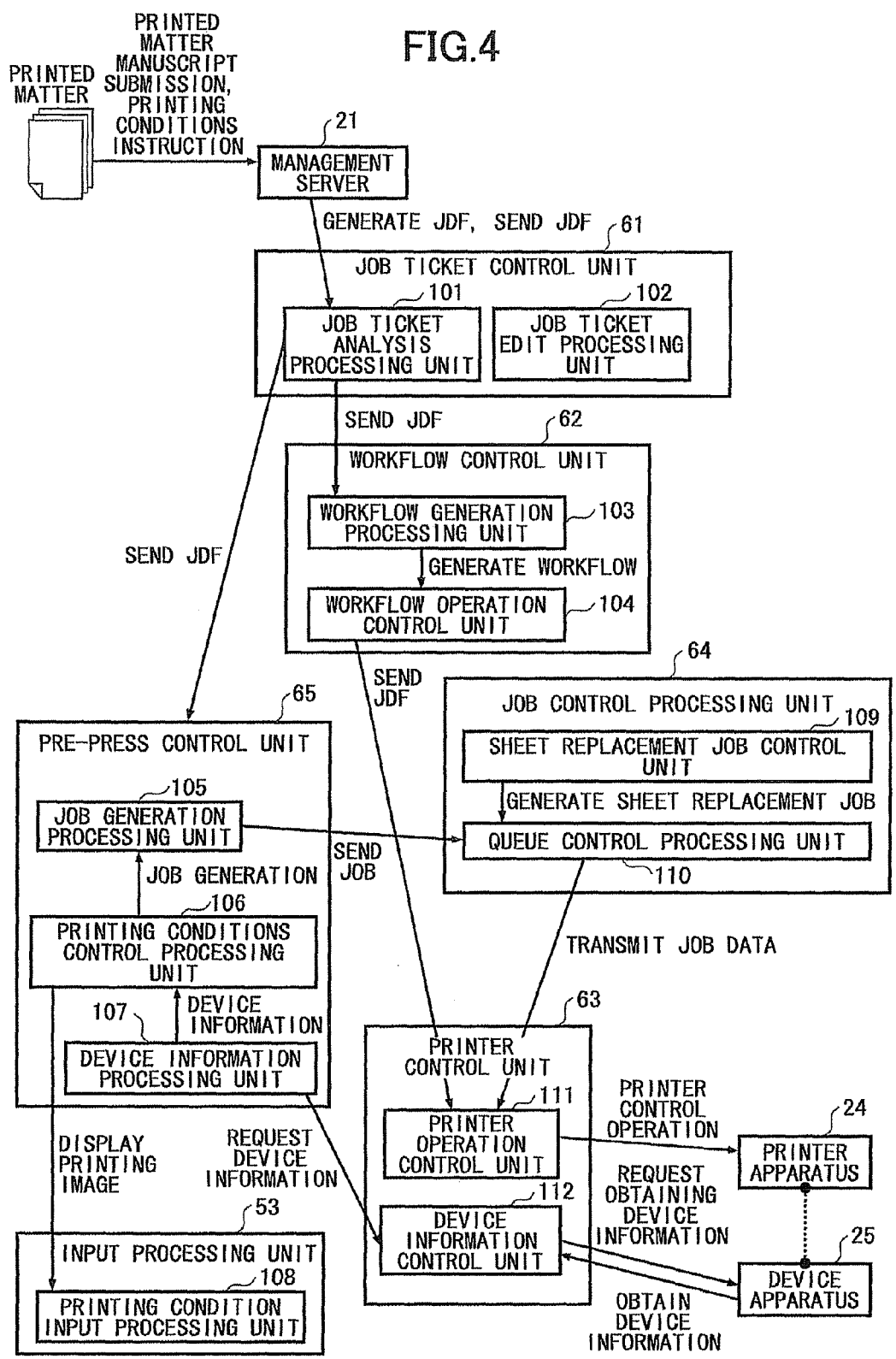
FIG. 4 is a diagram of an example explaining a process flow of the printing control system at the time of the printing process.
Figure 5:
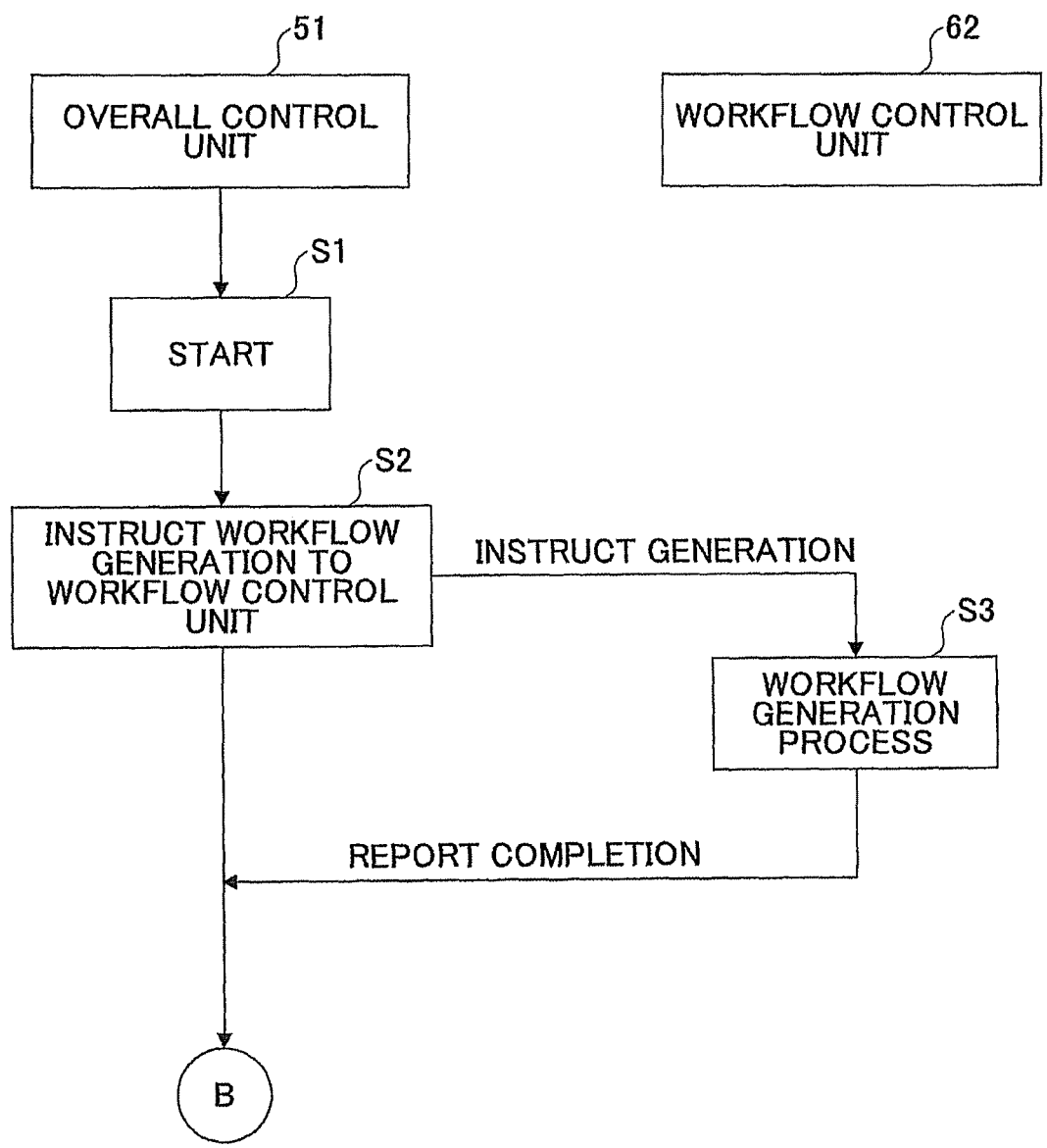
FIG. 5 is a first part of a sequence diagram of an example showing a flow of a process up to generating a printed output desired by a customer.
Figure 6:
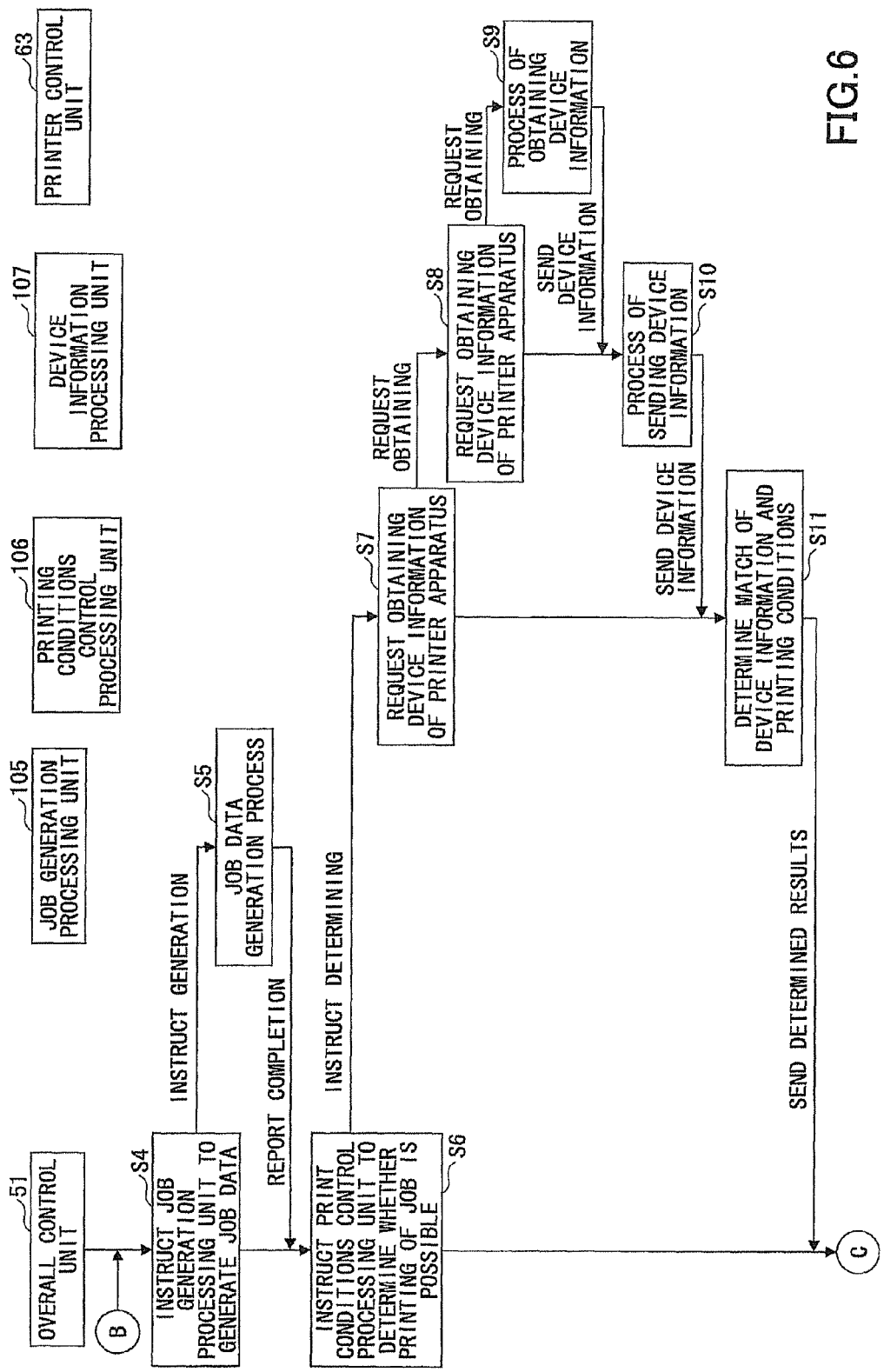
FIG. 6 is a second part of the sequence diagram of the example showing the flow of the process up to generating the printed output desired by the customer.
Figure 7:
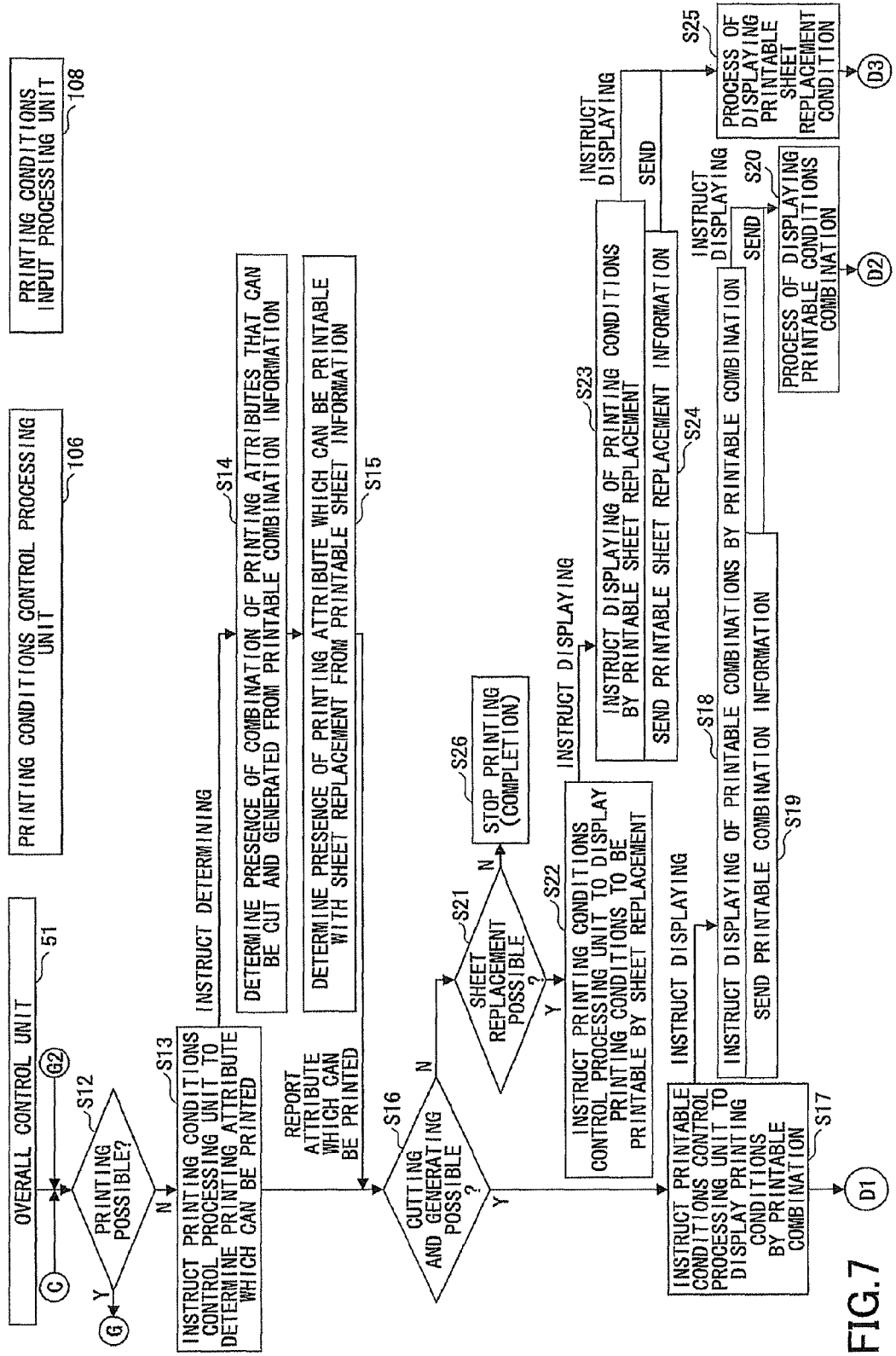
FIG. 7 is a third part of the sequence diagram of the example showing the flow of the process up to generating the printed output desired by the customer.
Figure 8:
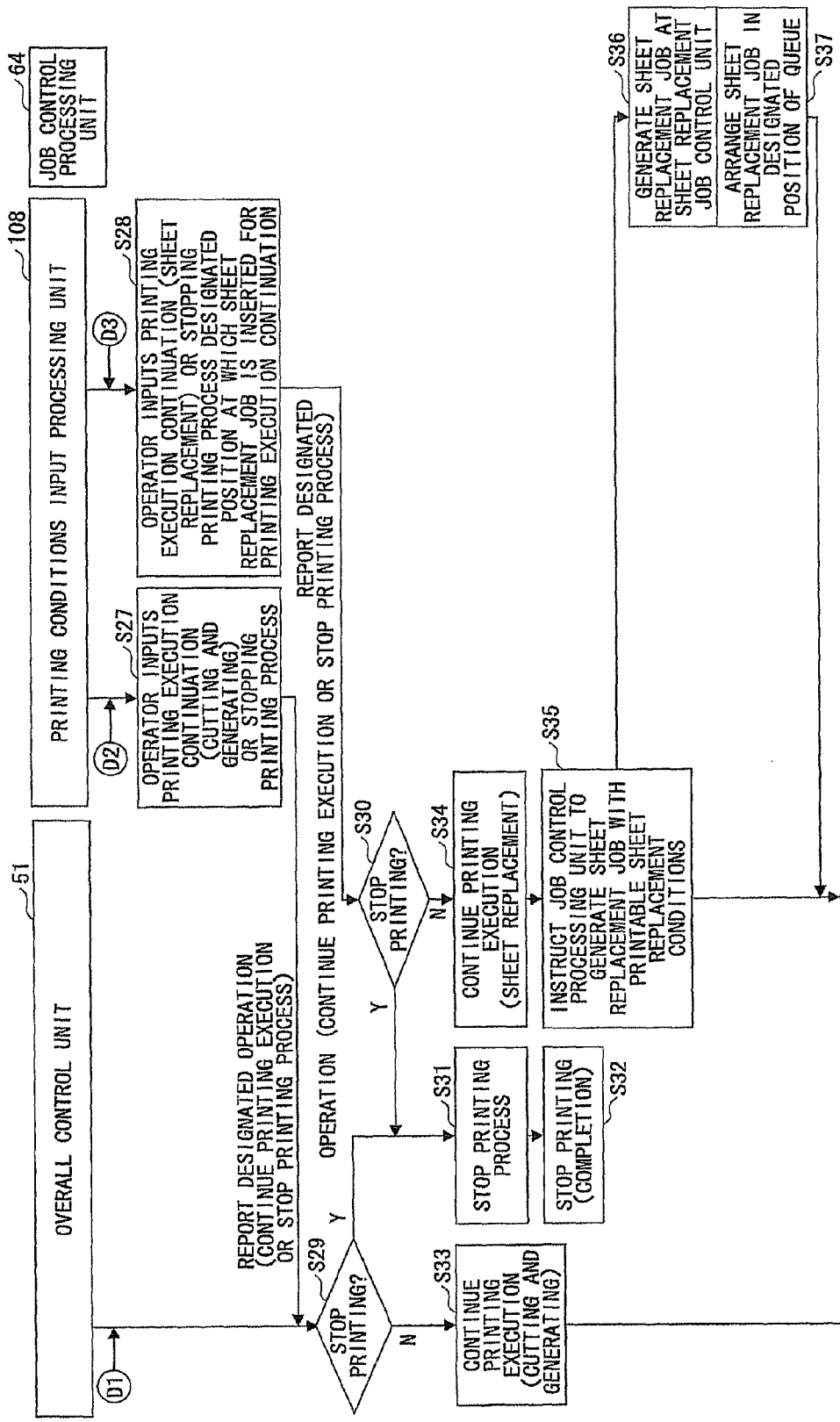
FIG. 8 is a fourth part of the sequence diagram of the example showing the flow of the process up to generating the printed output desired by the customer.
Figure 9:
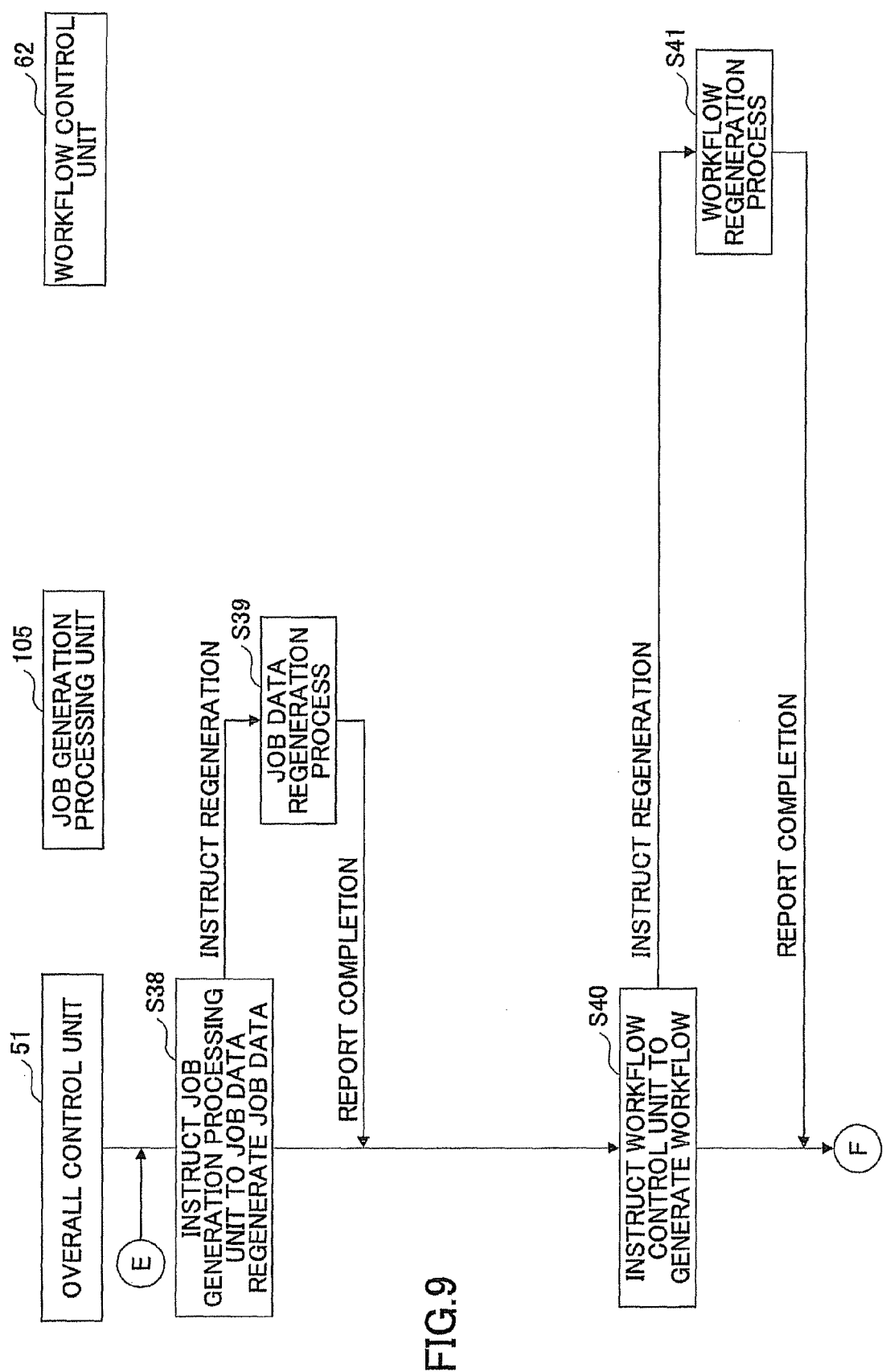
FIG. 9 is a fifth part of the sequence diagram of the example showing the flow of the process up to generating the printed output desired by the customer.
Figure 10:
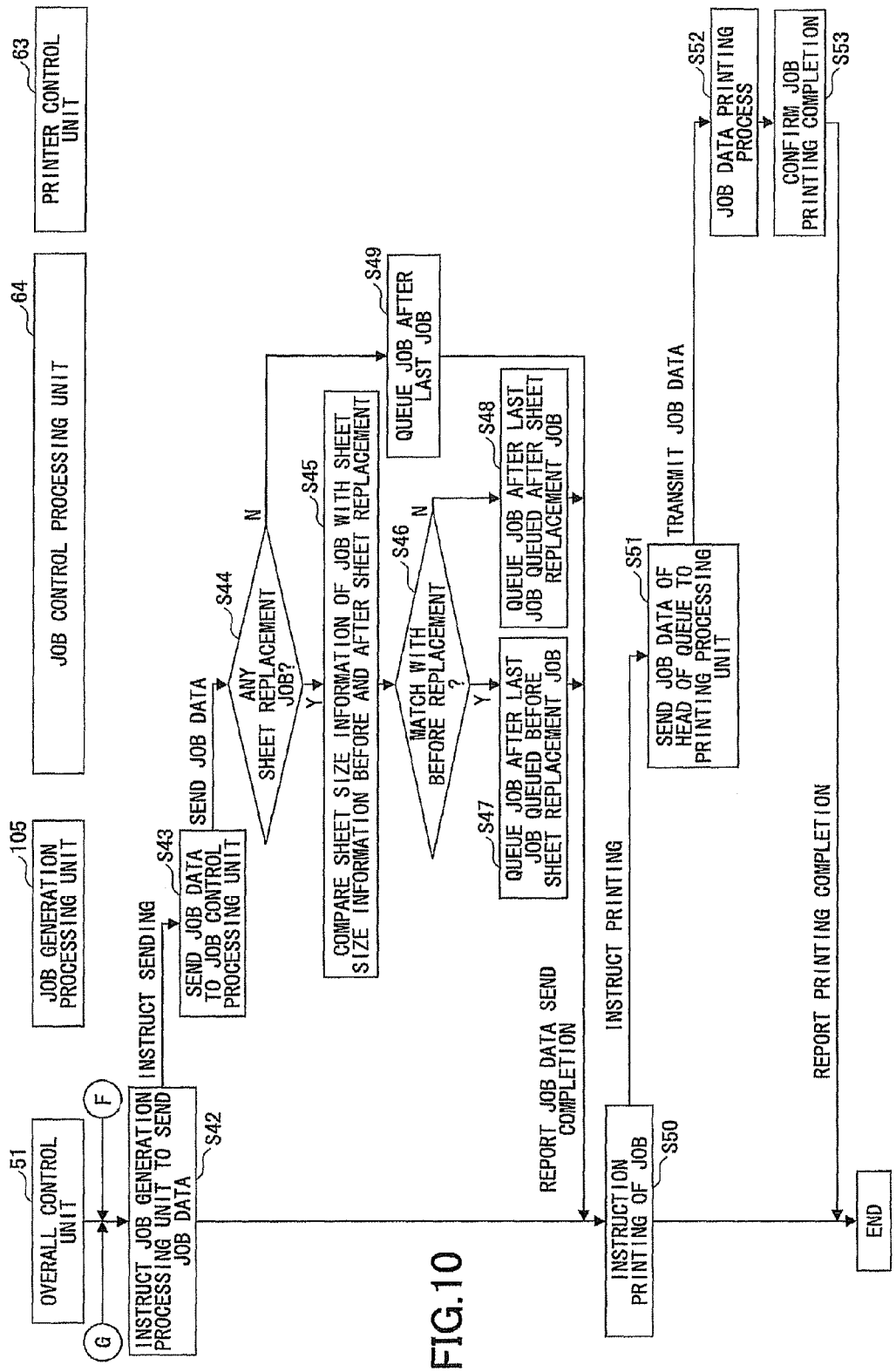
FIG. 10 is a sixth part of the sequence diagram of the example showing the flow of the process up to generating the printed output desired by the customer.

FIG. 4 is a diagram of an example for explaining a process flow of the printing control system at the time of printing processes. The operational instruction for performing the respective processes is provided by the overall control unit 51. Moreover, as the overall control unit 51 provides the operational instructions to the respective associated processing units, it holds printing system management information.

The printing system management information herein is what manages device groups which existed at the time of building the printing system 20. More specifically, the printing system management information includes a list of multiple printer apparatuses 24 used for performing a color printing process; similarly, a list of multiple printer apparatuses 24 used for performing a monochromatic printing process; the number of hosts such as the client PC 23, etc., that are connected via the network 26; locations at which exist the respective processing units such as the input processing unit 53 embedded in the hosts, etc.

In response to an instruction of printing conditions and a printed matter manuscript submitted from a customer, the management server 21 generates a JDF using a JDF generating application, etc. The instruction of the printing conditions by the customer may be specified for each printing process. Therefore, in the JDF, the printing conditions are defined for each printing process. Upon generating the JDF, the management server 21 sends the JDF to the job ticket control unit 61, which is a constituting element of the printing control system.

It is also possible for the management server 21 to hold a management function which is performed by the server called the MIS. Moreover, while the management server 21 has the management function and the JDF generating function within the same server, it may have the processing functions distributed in different servers.

The job ticket control unit 61 includes a job ticket analysis processing unit 101 and a job ticket edit processing unit 102. The job ticket analysis processing unit 101 analyzes printing conditions for the printing processes that are defined in the JDF transmitted from the management server 21; determines whether printing is possible in the printing system 20; and holds definition information required for the workflow control unit 62 to generate a workflow from the analyzed results.

If the printing conditions are changed by the operator in processes of pre-press, printing, post-processing, etc., the job ticket edit processing unit 102 edits what is defined in the JDF such that it matches the changed printing conditions and then edits definition information required for generating the workflow.

The workflow control unit 62 includes a workflow generation processing unit 103 and a workflow operation control unit 104. Based on what is defined in the JDF, the workflow generation processing unit 103 concatenates the operational processes from printed matter manuscript submission to printed output generation and generates a workflow. The workflow operation control unit 104 manages the status for each printing process and reports the status for each printing process to the operator.

The pre-press control unit 65 includes a job generation processing unit 105, a printing conditions control processing unit 106, and a device information processing unit 107. In FIG. 4, the process of transmitting and receiving printing data of the printing matter from the management server 21 to the pre-press control unit 65 is omitted. In the pre-press control unit 65, the printing data of the printing matter manuscript submitted by the customer is replaced with picture drawing data for each page. Moreover, based on an instruction to change the printing conditions from the below-described printing conditions input processing unit 108, the pre-press control unit 65 edits the picture drawing data such that the picture drawing data are printed onto a sheet with a specified layout.

The job generation processing unit 105 concatenates control information for carrying out the printing process by the printer apparatus 24 to the picture drawing data after converting the information into a data format which may be processed by the printer apparatus 24 to generate the printing job.

The device information processing unit 107, which is connected to the printing system 20 through the printer control unit 63, provides a device information request for obtaining information on the device apparatus 25 and the printer apparatus 24 that becomes necessary for generating a printed output under the printing conditions desired by the customer. The device information herein refers to individual information sets on the device apparatus 25 and printer apparatus 24 that are used when the printed output is generated. A specific example of the device information includes whether a cutting machine which becomes necessary in the post-operation process is installed.

The printing condition control processing unit 106 compares the device information on the printer apparatus 24 and the device apparatus 25 with the printing conditions desired by the customer, and determines whether the printing process may be carried out according to the printing conditions desired by the customer.

The input processing unit 53 includes a printing condition input processing unit 108. If it is determined that, as a result of carrying out the determination of whether the printing conditions control processing unit 106 may carry out the printing process according to the printing conditions desired by the customer, the printing is not possible, an instruction to change the printing conditions is accepted from the operator. The instruction to change the printing conditions by the operator will be described later.

The job control processing unit 64 includes a sheet replacement job control unit 109 and a queue control processing unit 110. The sheet replacement job control unit 109 generates a sheet replacement job which prompts the operator to perform a sheet replacement. The sheet replacement job holds information on a sheet size before the sheet replacement and information on a sheet size after the sheet replacement. The sheet sizes before and after the sheet replacement are arbitrarily set by the operator. The operator designates the sheet size and generates the sheet replacement job from a user interface included in the printing system 20. Details of the sheet replacement job are discussed below.

The queue control processing unit 110 basically performs a process of queuing a printing job submitted later after a printing job submitted earlier, but it is also possible to realize a job control such as an interrupt or a movement of the printing job being queued. For the queuing control, it is possible to perform a similar control for the printing job transmitted from the job generation processing unit 105 as well as for the sheet replacement job.

The printer control unit 63 includes a printer operation control unit 111 and a device information control unit 112. The printer operation control unit 111 controls the printer apparatus 24 such that it receives a printing job and prints the printing job under the printing conditions defined in the JDF. More specifically, the printer operation control unit 111 controls the operation of the printer apparatus 24 such that it performs a single-face printing or a double-face printing under the printing conditions defined in the JDF, a recovery process when a failure occurs during the printing process, etc. The device information control unit 112 controls obtaining of device information on the printer apparatus 24 and the device apparatus 25 connected to the printer apparatus 24 and changing of the device information to an arbitrary status. As a specific example, the device information control unit 112 may arbitrarily set a cutting position of a sheet in a post-operation process, for example.

FIGS. 5 to 10 are sequence diagrams of an example showing the flow of the process up to generating the printed output requested by the customer. Upon accepting an instruction of printing conditions and a submission of a printed matter manuscript from the customer, the management server 21 generates a JDF based on the printing data of the printed matter and the printing conditions (including the post-operation process) from the customer. The printing conditions associated with a request by the customer that are defined in the JDF include: a data size=A4; a sheet size=A4; a printing mode=double-face; any binding of sheets=yes; position of binding=left longitudinal side of the sheet, etc.

Upon generating the JDF, the management server 21 instructs the overall control unit 51 to perform a printing operation and sends the generated JDF to the job ticket control unit 61. Upon receiving the instruction for the printing operation from the management server 21, the overall control unit 51 starts the process in step S1.

In step S2, the overall control unit 51 instructs the workflow control unit 62 to generate a workflow. In step S3, based on the analyzed results of the JDF by the job ticket control unit 61, the work flow control unit 62 generates a workflow for printing a printing job under the printing conditions desired by the customer from attribute information of the JDF. The workflow control unit 62 transmits generated results of the generated workflow to the overall control unit 51.

In step S4, the overall control unit 51 instructs the job generation processing unit 105 to generate job data (a printing job). In step S5, the job generation processing unit 105 generates job data from picture drawing data corresponding to all of the pages. When the job data are generated, the job generating unit 105 transmits generated results of the job data to the overall control unit 51.

In step S6, with respect to the printing condition control processing unit 106, the overall control unit 51 compares the printing conditions with the status (the device information) of the printing apparatus 24 and provides an instruction to determine whether it is possible to print the generated printing job.

In step S7, upon receiving the instruction to determine from the overall control unit 51, the printing condition control processing unit 106 provides a request for obtaining the status (device information) of the device apparatus 25 and the printing apparatus 24 that are concerned with the printing conditions to the device information processing unit 107 and sends attributes of the device information associated with the printing conditions. The attributes of the device information associated with the printing conditions herein specifically include whether a tray 1 is mounted, a sheet size of the tray 1, whether a cutting apparatus is mounted, etc.

In step S8, upon receiving a request for obtaining device information, the device information processing unit 107 requests for obtaining the device information to the printer control unit 63. In step S9, upon receiving the request for obtaining the device information, the printer control unit 63 obtains the device information on the device apparatus 25 and the printer apparatus 24. As methods of obtaining the device information, methods are generally known which issue a device information command based on the interface with the device apparatus 25 and the printer apparatus 24 and obtain the device information with the response thereof and which obtain the device information with SNMP. The printer control unit 63 sends the obtained device information to the device information processing unit 107.

In step S10, the device information processing unit 107 sends the received device information to the printing conditions control processing unit 106. In step S11, the printing conditions control processing unit 106 determines whether the device information sent from the device information processing unit 107 and the printing conditions match by comparing the printing attributes (sheet size, etc.) and attribute values (A4, etc.). After performing the determination, the printing conditions control processing unit 106 sends results of the determination to the overall control unit 51.

In step S12, from the results of determining whether the device information and the printing conditions match, the overall control unit 51 determines whether printing is possible and the printing process may be continued. If it is determined, from the results of determining, that the printing is possible, the overall control unit 51 provides an instruction for sending job data to the job generation processing unit 105.

On the other hand, if it is determined that the printing is not possible, the overall control unit 51, in step S13, provides an instruction for determining printing attributes to yield that printing is possible to the printing conditions control processing unit 106. In step S14, from information on a combination of printing attributes to yield that printing is possible, the printing conditions control processing unit 106 determines whether there exists a combination of printing attributes which yield that cutting and generation are possible. In other words, the printing conditions control processing unit 106 determines whether it is possible to generate a sheet size included in the printing conditions by cutting a sheet currently mounted in the printer apparatus 24.

The printing conditions control processing unit 106 determines sheet sizes which can be cut and generated using a table as shown in FIG. 11, for example. FIG. 11 is a table showing an example of a combination of sheet sizes which can be cut and generated. The table in FIG. 11 collates a sheet size before cutting and a sheet size which can be generated by cutting. The table in FIG. 11 shows, for example, that an A4 size or an A5 size sheet may be generated by cutting from the A3 size sheet mounted in the printer apparatus 24, etc. The printing conditions control processing unit 106 may use the table in FIG. 11 and determine a sheet size which can be generated by cutting a sheet size which can be printed.

In other words, the printing conditions control processing unit 106 refers to the table in FIG. 11 and information on a combination of sheet sizes printable to determine whether the sheet size included in the printing conditions can be generated by cutting the sheet currently mounted in the printer apparatus 24.

Moreover, in step S15, the printing conditions control processing unit 106 refers to the information on the printable sheet. From the information on the printable sheet, the printing conditions control processing unit 106 determines whether there exists a printing attribute which can become printable by a sheet replacement. For example, even a sheet size which is not currently mounted in the printer apparatus 24 is mounted in the printer apparatus 24 by sheet replacement, so that the printable sheet size is determined to be a printable printing attribute. The printing conditions control processing unit 106 reports to the overall control unit 51 as a printable printing attribute, a combination of printing attributes such that sheets can be cut and generated, or a printing attribute by which sheets can be printed by sheet replacement.

In step S16, the overall control unit 51 determines whether there is a combination of printing attributes by which sheets can be cut and generated. If the combination of the printing attributes by which sheets can be cut and generated exists, the overall control unit 51, in step S17, instructs for displaying the printing conditions with the combination of the printing attributes by which sheets can be cut and generated to the printing conditions control processing unit 106.

In step S18, upon receiving the instruction for displaying the printing conditions with the combination of printing attributes by which sheets can be cut and generated, the printing condition control processing unit 106 instructs displaying of printing conditions with a combination of printing attributes by which sheets can be printed to the printing conditions input processing unit 108. Moreover, in step S19, the printing conditions control processing unit 106 sends information on a combination of printing attributes by which sheets can be printed to the printing conditions input processing unit 108.

Then, in step S20, the printing conditions input processing unit 108 displays, on a screen of a client PC 23 that performs input displaying of the printing conditions, information on a combination of printing attributes by which sheets can be printed. As a method of displaying, on the screen which performs input displaying of the printing conditions, information on a combination of printing attributes by which sheets can be printed, a method is generally known which uses a graphical user interface included in an application to perform screen displaying.

In step S16, if a combination of printing attributes by which sheets can be cut and generated does not exist, the overall control unit 51, in step S21, determines whether there is a printing attribute by which sheets can be printed by sheet replacement.

If there exists a printing attribute by which sheets can be printed by the sheet replacement, the overall control unit 51, in step S22, instructs the printing conditions control processing unit 106 to display the printing conditions with the printing attributes by which sheets can be printed by the sheet replacement.

In step S23, upon receiving the instruction for displaying the printing conditions with the printing attributes by which sheets can be printed by the sheet replacement, the printing condition control processing unit 106 instructs the printing conditions input processing unit 108 to display printing conditions with the printing attributes by which sheets can be printed by the sheet replacement. Moreover, in step S24, the printing conditions control processing unit 106 sends information on sheet replacement of printing attributes by which sheets can be printed to the printing conditions input processing unit 108.

Then, in step S25, the printing conditions input processing unit 108 displays, on a screen of a client PC 23 that performs input displaying of the printing conditions, information on sheet replacement of printing attributes by which sheets can be printed. If there exists no printing attribute by which sheets can be printed by the sheet replacement in step S21, the overall control unit 51 stops printing in step S26.

Here, a specific example of a process of the printing condition control processing unit 106 is explained. Suppose that the customer provides a manuscript submission of printing data of multiple pages in A4 size and desires a generation of a printed output with a sheet size=A4, a printing mode=double-face, and binding position=left longitudinal side of the sheets. Moreover, suppose that there is no A4 size sheet where the printer apparatus 24 is located. Furthermore, the printer apparatus 24 has mounted an A3 size sheet and has mounted a cutting apparatus.

Under such conditions, the printing system 20 generates a printed output desired by the customer according to the following printing process procedures. Upon receiving an instruction to determine the printing attributes by which sheets can be printed, the printing condition control processing unit 106 refers to the printing attributes of the received JDF and the attribute values as the printing conditions. Describing specific examples used in the explanations, information sets such as the sheet size=A4; the printing mode=double-face; binding position=left longitudinal side of the sheet, etc., correspond to the printing attributes of the received JDF and the attribute values as the printing conditions.

Next, the printing conditions control processing unit 106 compares the printing attributes of the received JDF and the attribute values as the printing conditions with the printing attributes of the device information groups and the attribute values that are sent, and specifies non-matching printing conditions as well as determining a combination of the printing attributes by which sheets can be printed.

Describing with specific examples, the device information of the printer apparatus 24 holds printing attributes and attribute values such as sheet size=A3 and presence of cutting apparatus=yes. In the above case, there is no match with the attribute value of the sheet size, so that a combination of printing attributes by which sheets can be printed is considered. As the sheet size=A3 and the cutting apparatus is mounted, it is seen that the printer apparatus 24 may cut the A3 size sheet at a center portion in the longitudinal side direction of the sheet to generate two A4 size sheets.

More specifically, picture drawing data corresponding to two A4 size pages may be arranged on an A3 size sheet in a 2Up layout and printed on the A3 size sheet, after which the A3 size sheet is cut at a central portion in the longitudinal side direction of the A3 size sheet to generate two A4 size sheets, making it possible to generate a printed output in line with the printing conditions desired by the customer.

As described above, when there is no match with the attribute values of the sheet size and the cutting apparatus is mounted, the cutting operation of the sheet may be added to yield printing conditions by which sheets can be printed. With a combination of the sheet size and the cutting method, the printing condition control processing unit 106 holds information on a combination of printing attributes by which sheets can be printed.

When an instruction to determine the printing attributes by which sheets can be printed is received from the overall control unit 51, the printing condition control processing unit 106 compares the printing attributes of the received JDF and the attribute values as the printing conditions with the printing conditions and attribute values of the device information group that are sent and determines the combination of the printing attributes by which sheets can be printed.

After displaying the combination of the printing attributes by which sheets can be printed by the cutting on the screen of the client PC 23, the printing conditions input processing unit 108, in step S27, accepts from the operator an input of an operation of either one of continuation of printing execution and stopping of the printing process.

Moreover, after displaying the printing attributes by which sheets can be printed by the sheet replacement on the screen of the client PC 23, the printing conditions input processing unit 108, in step S28, accepts from the operator an input of an operation of continuation of printing execution or stopping of the printing process. Furthermore, the printing condition input processing unit 108 also receives from the operator a designation of a position at which a sheet replacement job is inserted.

In step S27, upon the operator inputting the operation of either the continuation of printing execution or stopping of the printing process, the printing conditions input processing unit 108 reports to the overall control unit 51 the operation of either the continuation of printing execution or the stopping of the printing process for which the input has been accepted. In step S29, if the reporting is of the operation of the stopping of the printing process, the overall control unit 51 determines that the printing process be stopped in step S31. Then, in step S32, the overall control unit 51 stops the printing process. In this case, no printed output is generated. In step S29, if the reporting is of the operation of the continuation of the printing execution with cutting and generating, the overall control unit 51 continues the printing process with cutting in step S33.

In step S30, upon the operator inputting the operation of either the continuation of printing execution or stopping of the printing process, the printing conditions input processing unit 108 reports to the overall control unit 51 the operation of either the continuation of printing execution or the stopping of the printing process for which the input has been accepted. In step S30, if the reporting is of the operation of the stopping of the printing process, the overall control unit 51 determines that the printing process be stopped in step S31. Then, in step S32, the overall control unit 51 stops the printing process. In this case, no printed output is generated.

In step S30, if the reporting is of the operation of the continuation of the printing execution with sheet replacement, the overall control unit 51 continues the printing process with sheet replacement in step S34. In step S35, the overall control unit 51 instructs generating of the sheet replacement job of the printing attributes which can be printed (sheet replacement conditions by which sheets can be printed) with the sheet replacement to the job control processing unit 64.

In step S36, upon receiving an instruction for generating the sheet replacement job, the job control processing unit 64 generates a sheet replacement job by the sheet replacement job generating unit 109 to pass on the generated job to the queue control processing unit 110. In step S37, after arranging the sheet replacement job passed on from the sheet replacement job generating unit 109 at a position designated in the queue, the queue control processing unit 110 reports results of the operation to the overall control unit 51.

Upon receiving the report of results of the operation, the overall control unit 51 returns to step S12, where it again determines, from the results of determining whether the device information and the printing conditions match, whether the printing is possible and the printing process may be continued, after which the process beyond step S12 is performed.

Following step S33, the process proceeds to step S38, where the overall control unit 51 instructs the job generation processing unit 105 to regenerate job data (printing data). Upon receiving an instruction to regenerate the printing job, the job generation processing unit 105, in step S39, regenerates the printing job from the regenerated picture drawing data.

Upon completion of the regeneration of the printed job, the job generation processing unit 105 reports completion of the process of regenerating the printing job to the overall control unit 51. While omitted in the sequence diagram in FIG. 9, upon completion of the regeneration of the printing job, the overall control unit 51 instructs the printing condition control processing unit 106 to send a combination of printing attributes by which sheets can be printed. Upon receiving the instruction to send the combination of the printing attributes by which sheets can be printed, the printing condition control processing unit 106 sends the information on the combination of printing attributes by which sheets can be printed to the job ticket edit processing unit 102.

Upon receiving the combination information on the printing attributes by which sheets can be printed, the job ticket edit processing unit 102 reports reception of the combination information on the printing attributes by which sheets can be printed to the overall control unit 51. Upon receiving a report of reception of the information on the combination of the printing attributes by which sheets can be printed, the overall control unit 51 instructs the job ticket edit processing unit 102 to change the printing conditions defined in the JDF from the information on the combination of the printing attributes by which sheets can be printed. The job ticket edit processing unit 102 changes associated printing conditions out of printing conditions described in XML that are defined in the JDF.

In the above-described example, the printing conditions are changed such as the sheet size of A3; the layout setting of 2Up and addition of the sheet cutting process as a post-operation process. Upon completion of the process of changing the printing conditions, the job ticket edit processing unit 102 sends information on a combination of printing attributes by which sheets can be printed and the regenerated JDF to the workflow control unit 62. Upon receiving the information on the combination of the printing attributes which can be printed and the regenerated JDF, the workflow control unit 62 reports the reception to the overall control unit.

In step S40, the overall control unit 51 instructs the workflow control unit 62 to regenerate a workflow. From the information on the combination of the printing attributes by which sheets can be printed and the received JDF, the workflow is regenerated in order to continue performing the printing process under the changed printing conditions. Upon the regenerating of the workflow, the workflow control unit 62 transmits the JDF to the printer control unit 63. After transmitting the JDF, the workflow control unit 62 reports completion of regeneration of the workflow to the overall control unit 51.

Upon receiving the report of the completion of the regeneration of the workflow or determining that the printing is possible in step S12, the overall control unit 51 instructs sending the job data to the job generation processing unit 105 in step S42.

In step S43, upon receiving the instruction to send the job data, the job generation processing unit 105 sends the job data (the printing job) held on its own to the job control processing unit 64. In step S44, the job control processing unit 64 determines whether the job sequence queued in a queue has a sheet replacement job.

If there is the sheet replacement job in the job sequence queued in the queue, the queue control processing unit 110 of the job control processing unit 64, in step S45, compares sheet size information held by the printing job that is sent and sheet size information before and after the sheet replacement that is held by the sheet replacement job.

In step S46, the queue control processing unit 110 determines whether the sheet size information held by the printing job matches the sheet size information before the sheet replacement that is held by the sheet replacement job. If the sheet size information held by the printing job and the sheet size information before the sheet replacement that is held by the sheet replacement job match, the queue control processing unit 110, in step S47, queues the printing job sent from the job generation processing unit 105 before the sheet replacement job. If at least one printing job is already queued before the sheet replacement job, the queue control processing unit 110 queues the printing job sent from the job generation processing unit 105 following the last printing job of printing jobs already queued before the sheet replacement job. The job control processing unit 64 reports completion of sending job data to the overall control unit 51.

Moreover, if in step S46 the sheet size information held by the printing job and sheet size information before the sheet replacement that is held by the sheet replacement job do not match, the queue control processing unit 110 queues the printing job sent from the job generation processing unit 105 after the sheet replacement job in step S48. If at least one printing job is already queued after the sheet replacement job, the queue control processing unit 110 queues the printing job sent from the job generation processing unit 105 following the last printing job of printing jobs already queued after the sheet replacement job. The job control processing unit 64 reports completion of sending job data to the overall control unit 51.

In step S44, if there is no sheet replacement job in a job sequence queued in the queue, the queue control processing unit 110 of the job control processing unit 64 queues the printing job sent from the job generation processing unit 105 following the last printing job of the printing jobs already queued. The job control processing unit 64 reports completion of sending job data to the overall control unit 51.

Upon receiving the report of completion of sending the job data from the job control processing unit 64, the overall control unit 51, in step S50, sends instructions to print the printing job to the queue control processing unit 110 of the job control processing unit 64. In step S51, the queue control processing unit 110 of the job control processing unit 64 transmits the printing job at the head of the queue to the printer control unit 63.

Upon receiving the printing job, the printer control unit 63 prints the received printing job in step S52. In step S53, after confirming that the printing is completed, the printer control unit 63 reports completion of printing to the overall control unit 51.

For example, in the above-described specific example, if the picture drawing data are arranged on the A3 size sheet in a 2Up layout and the printing process is completed, a process of cutting the A3 size sheet is carried out and a printed output of an A4 size sheet is generated. The operator may collectively overlap a bundle of A4 size sheets to generate a printed output desired by the customer.

Figure 12:
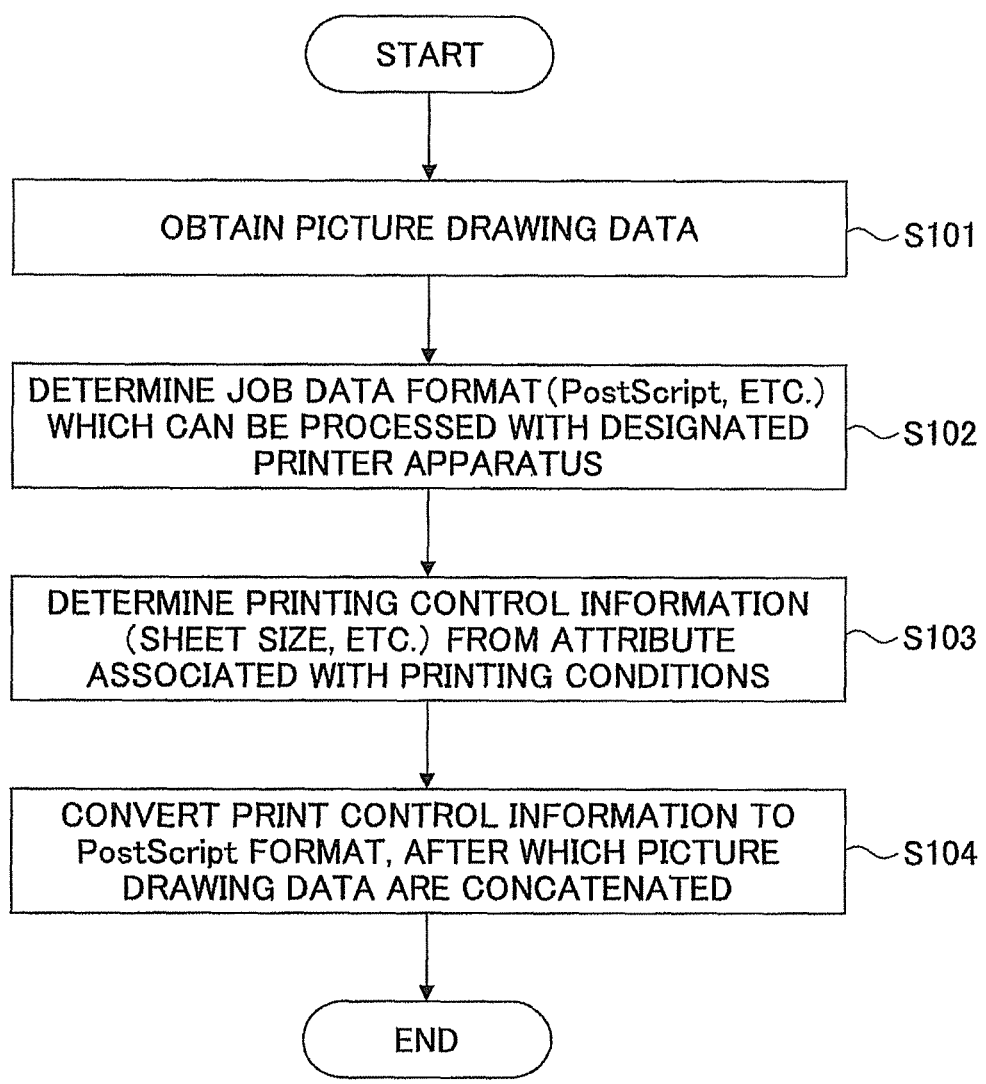
FIG. 12 is a flowchart showing an example of a processing procedure of a job generation processing unit.

FIG. 12 is a flowchart showing an example of a processing procedure of a job generation processing unit. In FIG. 12 is described an example in which a data format of the printing job is PostScript. In step S101, the job generation processing unit 105 receives picture drawing data for all of the pages. In step S102, the job generation processing unit 105 determines a data format (PostScript) of the printing job which can be processed by the printer apparatus 24 designated by the overall control unit 51.

In step S103, the job generation processing unit 105 determines control information (printing control information) for carrying out the printing process from printing attributes associated with the printing conditions and the attribute values. The printing control information herein refers to sheet size=A4; sheet type=plain; paper-supplying tray: tray 1; etc.

Figure 13:
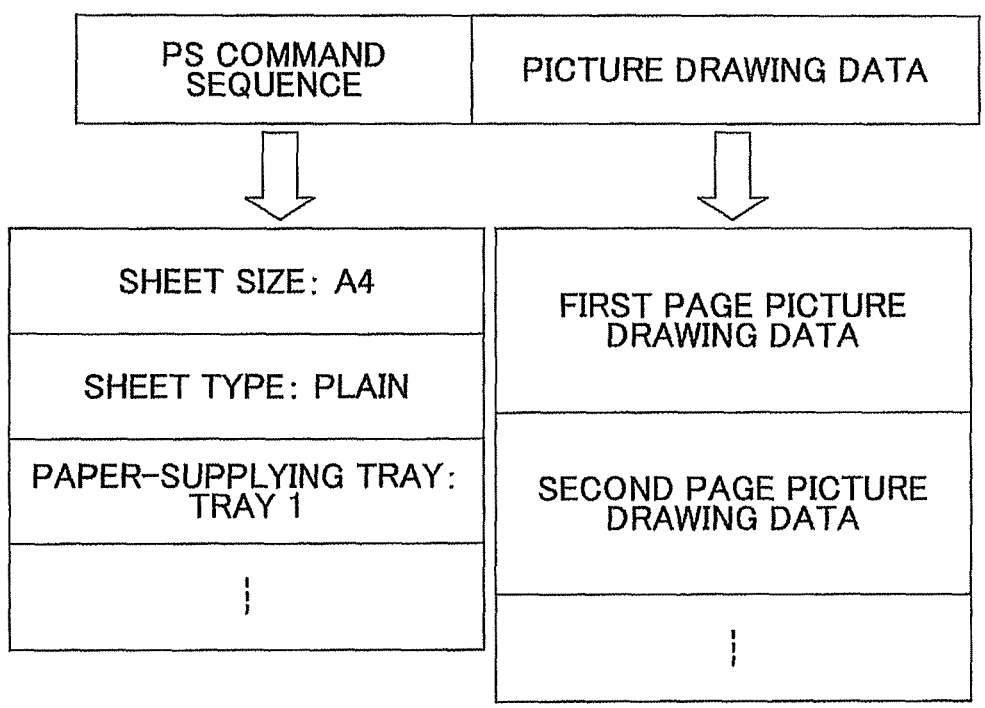
FIG. 13 is a configuration drawing of an example of a generated printing job.

In step S104, the job generation processing unit 105 generates a printing job as shown in FIG. 13, concatenating all of the printing control information groups converted to the data format of PostScript after the picture drawing data. FIG. 13 is a configuration diagram of an example of a generated printing job. In the printing job in FIG. 13, a PS (Post Script) command sequence, which is a printing control information group, is concatenated after the picture drawing data. The configuration of the printing job or the procedure for generating the printing job in FIG. 13 changes whenever the data format of the printing job changes.

FIGS. 14 and 15 are image diagrams of an example of a printed output. FIGS. 14 and 15 show an example in which printing matter of 20 pages with a sheet size=A4 and a printing mode=double-face is printed onto five A3 size sheets.

When the A3 size sheet is placed in a landscape (lateral) direction, pages with a data size of A4 may be arranged on the respective left and right sides of the A3 size sheet. FIG. 14 shows a page arrangement of five sheets of the A3 size. In FIG. 14, a page arrangement on the front face of the A3 size sheet is shown on the left side, while a page arrangement on the back face of the A3 size sheet is shown on the right side. FIG. 15A shows 20 pages with a data size A4 printed on the front and back faces of five A3 size sheets.

Figure 15B:
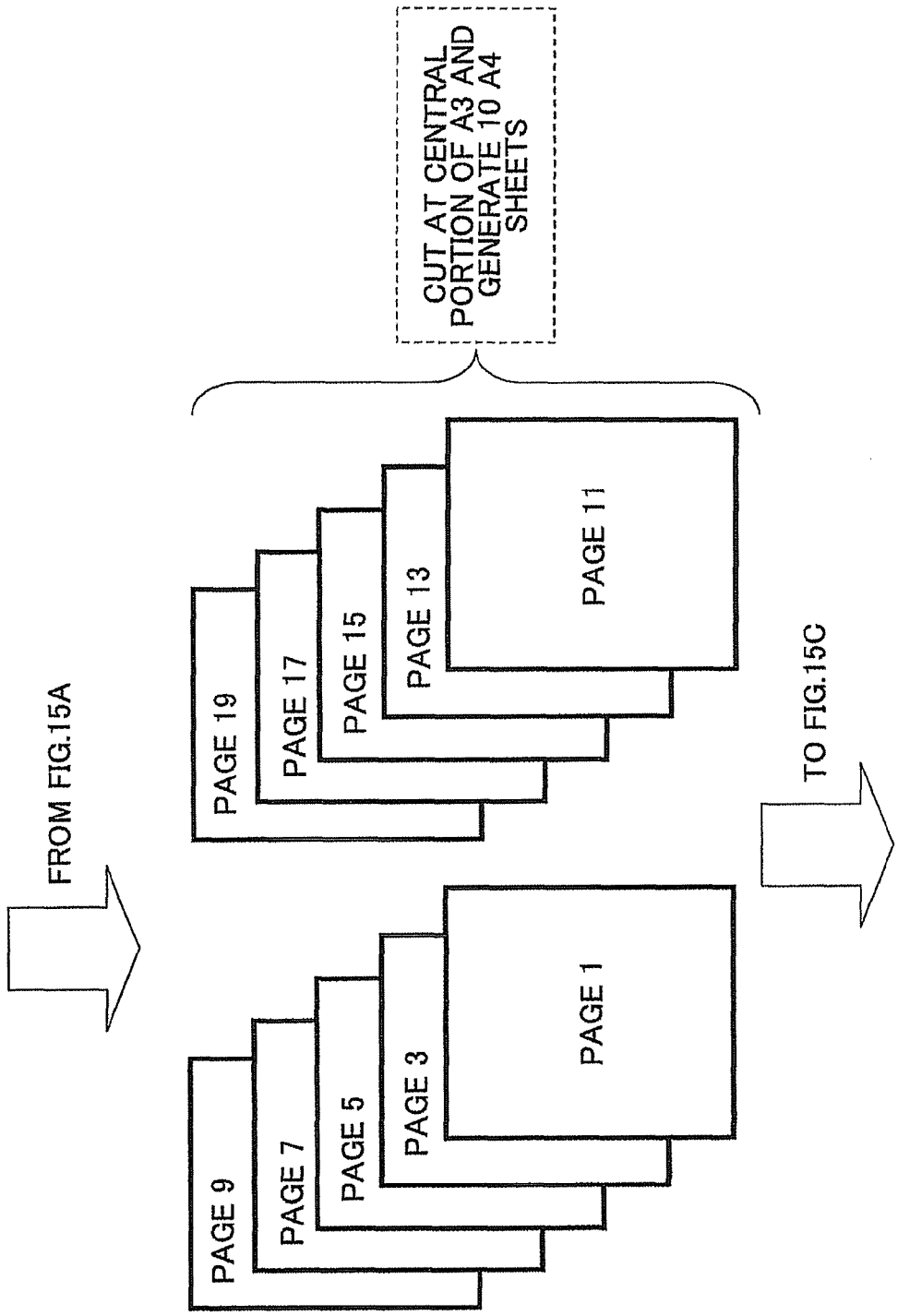

FIG. 15B shows the five A3 size sheets shown in FIG. 15A being overlapped and all cut at the central portion to generate ten A4 size sheets. On five A4 size sheets on the left side of FIG. 15B are arranged the first page through the 10th page. Moreover, on five A4 size sheets on the right side of FIG. 15B are arranged the 11th page through the 20th page.

Figure 15C:
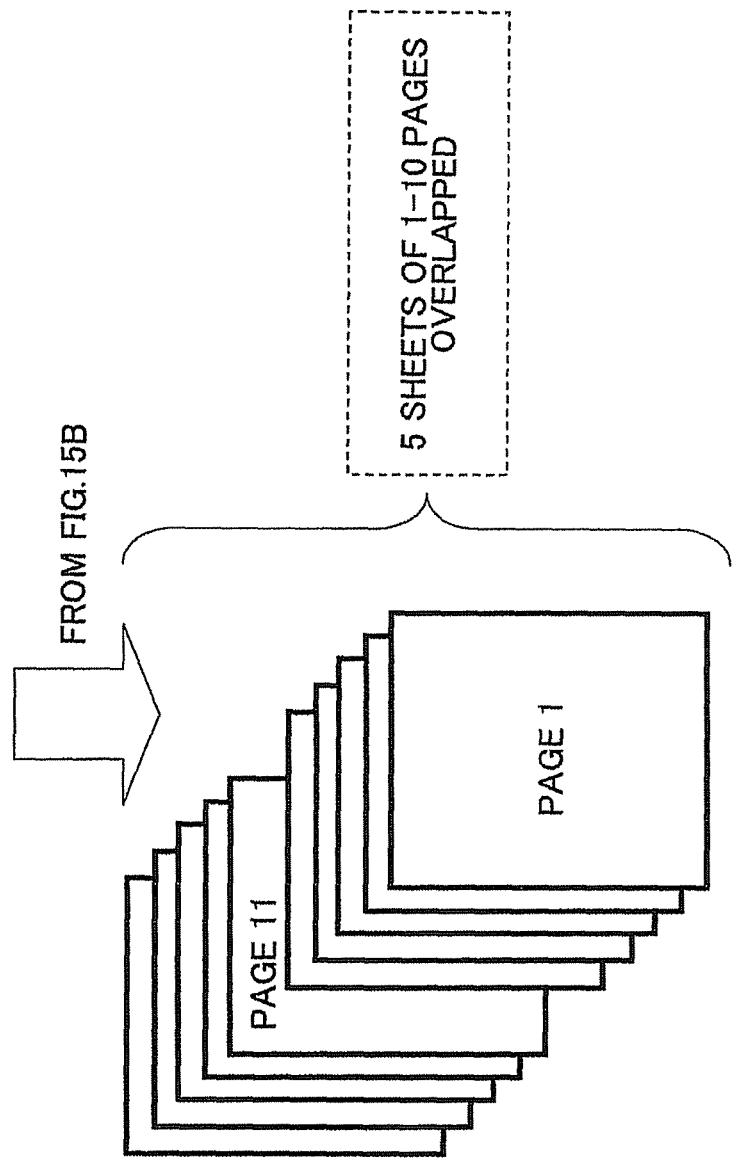

FIG. 15C shows five A4 size sheets on the left side of FIG. 15B with the first to the 10th page being arranged to overlap five A4 size sheets on the right side of FIG. 15B with the 11th to the 20th page being arranged.

In order to generate the printed output as shown in FIG. 15C, the first page, as shown in FIG. 14, may be arranged on the left side of the front face of the first A3 size sheet; the 11th page may be arranged on the right side of the front face of the first A3 size sheet; the 12th page may be arranged on the left side of the back face of the first A3 size sheet; and the second page may be arranged on the right side of the back face of the first A3 size sheet.

Below in a similar manner, the third page is arranged on the left side of the front face of the second sheet; the 13th page may be arranged on the right side of the front face of the second sheet; the 14th page may be arranged on the left side of the back face of the second sheet; and the fourth page may be arranged on the right side of the back face of the second sheet, so that a page arrangement is performed, repeating the above-described theory up to the fifth sheet. The page arrangement in FIG. 14 may be called "speed" printing. The page arrangement in which the same page is arranged on the left and the right of the A3 size sheet may also be called double printing.

FIG. 16 is an explanatory diagram showing a status of a common queue when there is no sheet replacement job. FIG. 16 shows a status in which a total of eight printing jobs are successively submitted in an order from "job 1" to "job 8". The odd-numbered printing jobs have specified printing onto an A3 sheet. The even-numbered printing jobs have specified printing onto an A4 sheet. In general, a printing job submitted later is queued following a printing job submitted earlier. Such a queuing control is repeated, so that, in the present invention, a printing job for printing onto the A3 sheet and a printing job for printing onto the A4 sheet are alternately queued.

Queuing is done when a size of a sheet actually set in a paper-supplying unit of the printer apparatus 24 matches a size of a sheet actually specified by the printing job. Thus, in order to print all of the printing jobs shown in FIG. 16, when the paper-supplying unit is one printer apparatus 24, an operation of sheet replacement from the A3 size sheet to the A4 size sheet or from the A4 size sheet to the A3 size sheet takes place whenever a completion of one printing job is reported, so that the printing operation stopping time becomes longer.

Figure 17:
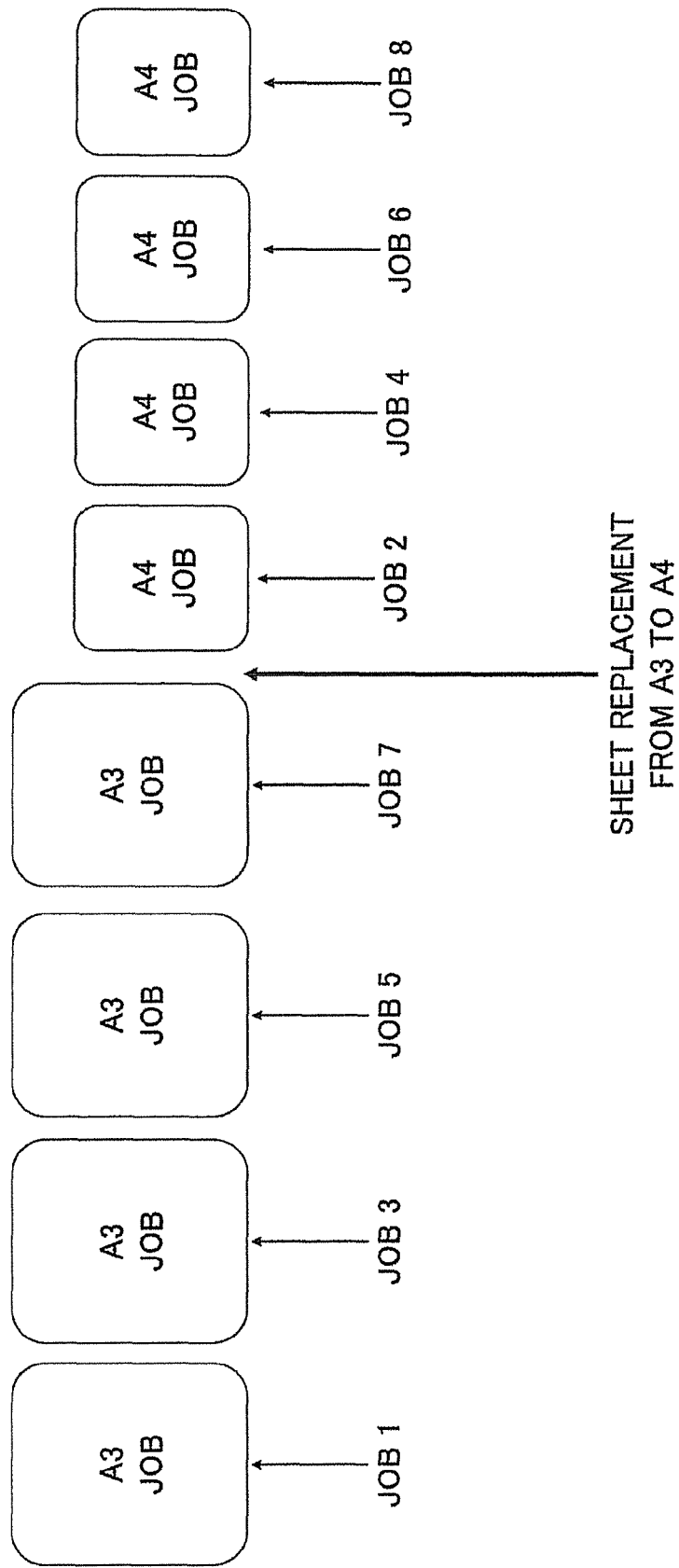
FIG. 17 is an explanatory diagram showing a preferable queue status.

FIG. 17 is an explanatory diagram showing a preferable queue status. If submitted consecutively in the order as shown in FIG. 17, for eight printing jobs shown in FIG. 16, four of the printing jobs onto the A3 size sheet are collectively queued. In FIG. 17, after completion of four printing jobs onto the A3 size sheet is reported, an operation of sheet replacement from the A3 size sheet to the A4 size sheet takes place. Thereafter, in FIG. 17, as four of the printing jobs onto the A4 size sheet are collectively queued, it suffices to carry out the operation of sheet replacement from the A3 size sheet to the A4 size sheet only once, so that the printing operation stopping time becomes short.

Figure 18:
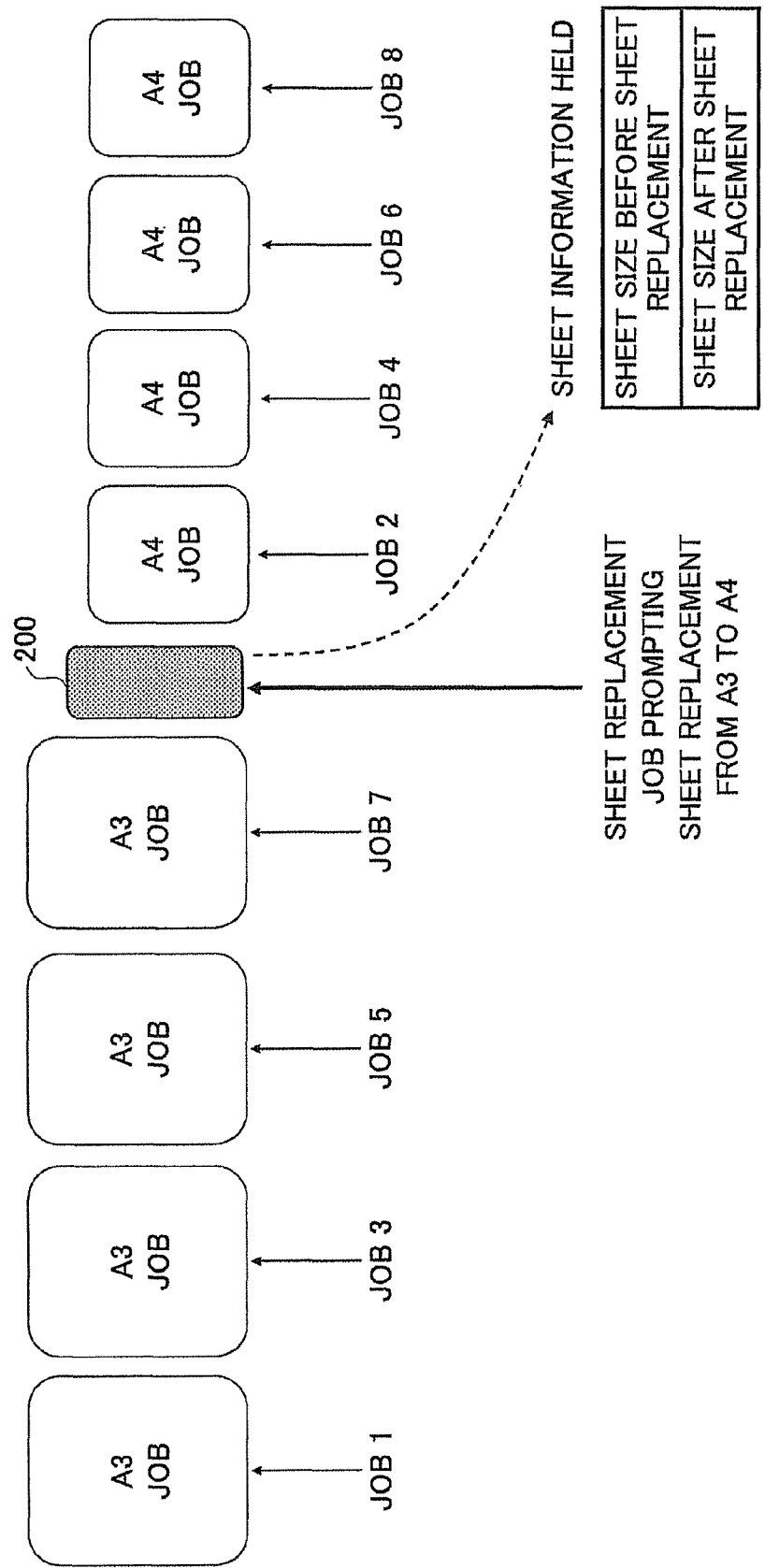
FIG. 18 is an explanatory diagram showing a queue status when there is a sheet replacement job.

In the present invention, a sheet replacement job is used in order to realize the queue status shown in FIG. 17. FIG. 18 is an explanatory diagram showing a status of a queue when there is a sheet replacement job. In FIG. 18, after four of the printing jobs onto the A3 size sheet are collectively executed, a sheet replacement job 200 is executed which prompts an operator to perform sheet replacement from the A3 size sheet to the A4 size sheet. When the sheet replacement job 200 is executed, the operator performs the operation of sheet replacement from the A3 size sheet to the A4 size sheet. Then, in FIG. 18, after the operation of sheet replacement from the A3 size sheet to the A4 size sheet, four of the printing jobs onto the A4 size sheet are collectively executed.

In FIG. 18, the sheet replacement job 200 may be executed at the border of the printing jobs at which a sheet size specified in the printing job changes from the A3 size to the A4 size to report the necessity of sheet replacement to the operator. Possible methods to make the operator aware of the necessity of sheet replacement include issuing an alarm screen onto a display apparatus of the client PC 23 or the printing control system-installed server 22, etc., or issuing an alarm display on an operating panel of the printer apparatus 24.

The sheet replacement job 200 has the sheet size before the sheet replacement and the sheet size after the sheet replacement as sheet information. In the printing control system-installed server 22, the sheet replacement job control unit 109 may be provided with a function of setting, from an UI by an operator, a sheet size before sheet replacement and a sheet size after sheet replacement to realize holding of information on and setting of the sheet size before the sheet replacement and the sheet size after the replacement.

As described above, when the sheet size which is actually set in the paper-supplying unit of the printer apparatus 24 does not match the sheet size specified in the printing job, the printing job is not queued.

On the other hand, even when the sheet size which is actually set in the paper-supplying unit of the printer apparatus 24 does not match the sheet size specified in the printing job, if the sheet size after the sheet replacement that is held by the sheet replacement job 200 matches the sheet size specified in the printing job, queuing using the sheet replacement job 200 is performed.

In this way, the sheet replacement job 200 acts as a complementary function of information (a current value) on the sheet size which is actually set in the paper-supplying unit of the printer apparatus 24. The sheet size after the sheet replacement that is held by the sheet replacement job 200 becomes information complementary to information on the sheet size which is actually set in the paper-supplying unit of the printer apparatus 24.

In the present embodiment, the sheet replacement job 200 acts as a function complementary to information on the sheet size actually set in the paper-supplying unit of the printer apparatus 24, so that the printing job is queued in a status as shown in FIG. 18.

Figure 19:
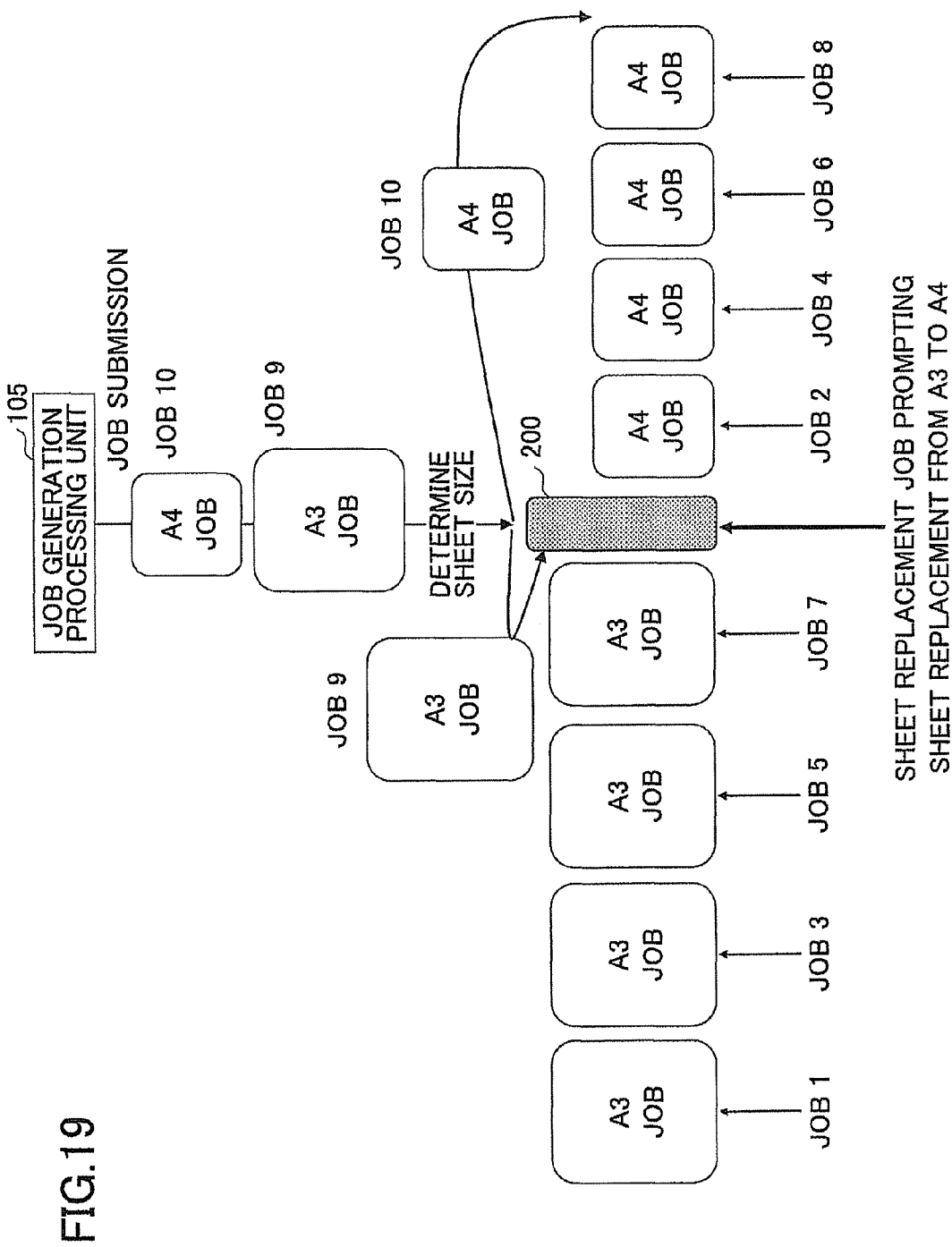
FIG. 19 is an explanatory diagram showing a queue status when a printing job is newly submitted.

When a printing job "job 9" of size A3 and a printing job "job 10" of size A4 are newly submitted from the queue status shown in FIG. 18, the queue status becomes what is shown in FIG. 19. FIG. 19 is an explanatory diagram showing a status of a queue when a printing job is newly submitted.

For a printing job which is newly submitted, the sheet size specified in the printing job and the sheet size before and after the sheet replacement that is held by the sheet replacement job 200 are compared, and it is determined whether queuing is to be done before or after the sheet replacement job 200.

For example, when it is determined that queuing is to be done before the sheet replacement job 200, the newly submitted printing job is queued at the end of the printing jobs being queued before the sheet replacement job 200 (at the end of a sub-queue of the A3 sheet printing). In the example in FIG. 19, when the "job 9" is submitted, it is queued after the "job 7", which is queued at the end of the sub queue of the A3 sheet printing.

Moreover, when it is determined that queuing is done after the sheet replacement job 200, the newly submitted printing job is queued at the end of the printing jobs queued after the sheet replacement job 200 (at the end of a sub-queue of the A4 sheet printing). In the example in FIG. 19, when the "job 10" is submitted, it is queued after the "job 8", which is queued at the end of the sub queue of the A4 sheet printing. In this way, the sheet replacement job 200 acts as a function of apportioning the printing job schedules.

FIG. 20 is a flowchart showing an example of a processing procedure of a printing system when a sheet replacement job is used for an operator to print a printing job. Many patterns exist for the processing procedure of the printing system 20, so that specific examples will be explained with the following preconditions:

The preconditions are that there is one printer paper-supplying unit (can set sheets of size A3 or A4); an A3 size sheet is mounted in the printer paper-supplying unit; and no cutting machine. In step S201, the operator performs printing of printing jobs from "job 1" to "job 10". As the printing conditions, the operator specifies printing onto the A3 size sheet as odd-numbered printing jobs and printing onto the A4 size sheet as even-numbered printing jobs In step S202, the "job 1" can be printed with the preconditions, so that it is queued at the head of the queue. In step S203, the "job 2" cannot be printed with the preconditions, but can be printed with the sheet replacement. Then, the printing system 20 displays to the operator the printing condition (creation of sheet replacement job from A3 size to A4 size). In step S204, the operator selects printing continuation (sheet replacement job creation) or printing stopping of "job 2" to input the selected results.

In step S205, when the operator selects the printing stopping, the printing of "job 2" is stopped. When the operator selects printing continuation and specifies inserting of a sheet replacement job from the A3 size to the A4 size after "job 1", the sheet replacement job 200 is created after "job 1", and "job 2" is queued after the sheet replacement job 200.

In step S206, when the sheet replacement job 200 from the A3 size to the A4 size is created, the printing job is queued before and after the sheet replacement job 200 by a process of the job control processing unit 64.

The printing jobs (jobs 3, 5, 7, and 9) of size A3 are queued immediately before the sheet replacement job 200. Moreover, the printing jobs (jobs 4, 6, 8, and 10) of size A4 are queued at the tail of the queue. When the sheet replacement job 200 from size A3 to size A4 is not created, the printing system 20 performs a process similar to steps S203 to S205.

In step S207, the job control processing unit 64 transmits an A3 size printing job to the printer control unit 63. All of five A3 size printing jobs are printed. After all of the A3 size printing jobs are output to the printer apparatus 24, when printing of the A3 size printing jobs is completed and the printing is stopped, the sheet replacement job 200 informs the operator of sheet replacement from the A3 size sheet to the A4 size sheet.

In step S209, the operator changes the sheet of the printer apparatus 24 from the A3 size sheet to the A4 size sheet. In step S210, when the sheet replacement job 200 reports the sheet replacement prompting the operator to perform sheet replacement, the job control processing unit 64 periodically communicates with the printer control unit 63, and determines whether the sheet in the paper-supplying unit is changed from the A3 size sheet to the A4 size sheet. When changed to the A4 size sheet, the job control processing unit 64 deletes the sheet replacement jobs 200 stacked in a job sequence by itself. Thereafter, the job control processing unit 64 transmits the A4 size printing jobs (jobs 4, 6, 8, and 10) to the printer control unit 63. All of five A4 size printing jobs are printed.

The present embodiment makes it possible to solve the problems in the related art that it does not take into account that an appropriate layout is determined with a combination of a size of a sheet which is mounted in the printer apparatus 24 and a size of a sheet on which printing is to be performed.

For example, in the above-described specific example, it is determined that it is suitable to arrange two pages of A4 size printed matter on an A3 size sheet in a 2UP layout since the size of the sheet mounted in the printer apparatus 24 is A3 size and the sheet size for printing is A4 size. When the sheet size for printing is A5 size, it may be determined that it is suitable to arrange four pages of A5 size printing data on the A3 size sheet in a 4UP layout.

The present invention is not limited to the specific embodiments disclosed, so that variations and changes are possible without departing from the claims.

The present application is based on Japanese Priority Application No. 2011-124538 filed on Jun. 2, 2011, the entire contents of which are hereby incorporated by reference.

The invention claimed is:

1. A non-transitory printing control program product which causes a computer to function as:
   a printer control unit configured to obtain a size of a sheet mounted in a printer apparatus or a device apparatus;
   a printing conditions control processing unit configured to determine whether the size of the sheet mounted in the printer apparatus or the device apparatus matches a size of a sheet onto which printing is to be made, which printing is included in printing conditions designated by an operator to generate a printed output; and
   a control unit configured to arrange picture drawing data of the printed output in a layout suitable for the size of the sheet onto which the printing is to be made by cutting the mounted sheet, along the layout after the printing, and generating the printed output, if a printing job is determined not to match and the size of the sheet onto which the printing is to be made can be generated by cutting the mounted sheet,
   a sheet replacement lob control unit configured to generate a sheet replacement job which prompts the operator to perform a sheet replacement operation; and
   a queue control processing unit configured to queue the sheet replacement job, wherein,
      if the printing job is determined not to match, and the size of the sheet onto which the printing is to be made cannot be generated by cutting the mounted sheet and
      if the size of the sheet onto which the printing is to be made can be generated by changing the size of the sheet mounted in the printer apparatus or the device apparatus,
      the control unit is configured to instruct the sheet replacement job control unit to generate the sheet replacement job and queue the printing jobs of the printed output before and after the sheet replacement job such that the size of the sheet onto which the printing is to be made and information on a size of a sheet before and after the sheet replacement that is held by the sheet replacement job match.

2. The non-transitory printing control program product as claimed in claim 1, wherein, when the size of the sheet onto which the printing is to be made can be generated by cutting the mounted sheet, after the size of the sheet mounted on the printer apparatus or the device apparatus is changed, the overall control unit arranges picture drawing data of the printed output in a layout suitable for the size of the sheet onto which the printing is to be made, cuts along the layout after the printing, and generates the printed output.

3. The non-transitory printing control program product as claimed in claim 1, wherein the queue control processing unit is configured to queue the printing job for which the size of the sheet onto which the printing is to be made and the information on the size of the sheet before the sheet replacement that is held by the sheet replacement job match at the end of the printing job before the sheet replacement job and queue the printing job for which the size of the sheet onto which the printing is to be made and the information on the size of the sheet after the sheet replacement that is held by the sheet replacement job match at the end of the printing job after the sheet replacement job.

4. A method for performing a printing process, comprising:
   using the non-transitory printing control program product of claim 1.

5. A printing control apparatus, comprising:
   a printer control unit configured to obtain a size of a sheet mounted in a printer apparatus or a device apparatus;
   a printing conditions control processing unit configured to determine whether the size of the sheet mounted in the printer apparatus or the device apparatus matches a size of a sheet onto which printing is to be made, which printing is included in printing conditions designated by an operator to generate a printed output; and
   a control unit configured to arrange picture drawing data of the printed output in a layout suitable for the size of the sheet onto which the printing is to be made by cutting the mounted sheet, along the layout after the printing, and generating the printed output, if a printing job is determined not to match and the size of the sheet onto which the printing is to be made can be generated by cutting the mounted sheet,
      a sheet replacement job control unit configured to generate a sheet replacement job which prompts the operator to perform a sheet replacement operation; and
      a queue control processing unit configured to queue the sheet replacement job, wherein,
      if the printing job is determined not to match, and the size of the sheet onto which the printing is to be made cannot be generated by cutting the mounted sheet, and
      if the size of the sheet onto which the printing is to be made can be generated by changing the size of the sheet mounted in the printer apparatus or the device apparatus,
      the control unit is configured to instruct the sheet replacement job control unit to generate the sheet replacement job and queue the printing jobs of the printed output before and after the sheet replacement job such that the size of the sheet onto which the printing is to be made and information on a size of a sheet before and after the sheet replacement that is held by the sheet replacement job match.

6. A method for performing a printing process, comprising: using the printing control apparatus of claim 5.

7. A printing system, comprising:
   a non-transitory printing control program product as claimed in claim 1 that is executable by a computer; and
   an image forming apparatus.

* * * * *